(12) United States Patent
Araki et al.

(10) Patent No.: US 11,500,080 B2
(45) Date of Patent: Nov. 15, 2022

(54) AXIS DEVIATION DETECTION DEVICE FOR ON-BOARD LIDAR

(71) Applicant: Toyota Jidosha Kabushiki Kaisha, Toyota (JP)

(72) Inventors: Ryutaro Araki, Susono (JP); Masamichi Ohsugi, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 469 days.

(21) Appl. No.: 16/788,852

(22) Filed: Feb. 12, 2020

(65) Prior Publication Data

US 2020/0284889 A1  Sep. 10, 2020

(30) Foreign Application Priority Data

Mar. 5, 2019  (JP) .............................. JP2019-039978

(51) Int. Cl.
*G01S 17/06* (2006.01)
*G01S 7/497* (2006.01)
(Continued)

(52) U.S. Cl.
CPC .......... *G01S 7/4972* (2013.01); *G01B 11/272* (2013.01); *G01S 7/484* (2013.01);
(Continued)

(58) Field of Classification Search
CPC ........ G01S 17/931; G01S 17/89; G01S 17/86; G01S 7/4972; G01S 17/42; G01S 7/4817; G01S 7/497; G01S 17/87; G01S 7/4815; G01S 13/865; G01S 7/51; G01S 13/867; G01S 17/06; G01S 17/08; G01S 7/4026; G01S 13/931; G01S 7/4808; G01S 17/10; G01S 7/4813; G01S 17/894; G01S 7/484; G01S 7/4811; G01S 7/4816; G01S 13/87; G01S 2013/9323; G01S 7/4802; G01S 7/481; G01S 7/4865; G01S 7/4868; G01S 15/931; G01S 17/58; G01S 2013/9316; G01S 5/0018; G01S 5/16; G01S 17/875; G01S 17/88; G01S 2013/9322;
(Continued)

(56) References Cited

FOREIGN PATENT DOCUMENTS

EP          3422049 A1 *  1/2019  ............ G01S 17/86
JP      H10-011580 A      1/1998
(Continued)

*Primary Examiner* — Michael P Stafira
(74) *Attorney, Agent, or Firm* — Dinsmore & Shohl LLP

(57) ABSTRACT

An axis deviation detection device includes: a first detection unit that detects a first object from pickup information acquired by a camera disposed in an interior of a vehicle cabin of a vehicle; a second detection unit that detects a second object from point information acquired by a LIDAR disposed in an exterior of the vehicle cabin of the vehicle; and an axis deviation angle estimation unit that estimates an axis deviation angle of the LIDAR to the camera, and that estimates that the axis deviation angle of the LIDAR to the camera is a predetermined angle, in a case where a result of comparison between a detection result of the first detection unit and an after-rotation detection result from rotating a detection result of the second detection unit by the predetermined angle about an attachment position of the LIDAR on the vehicle satisfies a predetermined condition.

8 Claims, 13 Drawing Sheets

(51) Int. Cl.
    *G01S 17/88*     (2006.01)
    *G01S 7/481*     (2006.01)
    *G01B 11/27*     (2006.01)
    *G01S 7/484*     (2006.01)

(52) U.S. Cl.
    CPC ............ *G01S 7/4817* (2013.01); *G01S 17/06* (2013.01); *G01S 17/88* (2013.01)

(58) Field of Classification Search
CPC ........ G01S 7/4863; G01S 7/487; G01S 19/41; G01S 19/43; G01S 19/44; G01S 19/45; G01S 19/48; G01S 19/49; G01S 13/86; G01S 13/862; G01S 2013/93271; G01S 2013/93272; G01S 2013/93273; G01S 2013/93274; G01S 5/0252; G01S 7/40; G01S 7/4804; G01S 7/4812; G01S 7/52004; G01S 15/86; G01S 17/04; G01S 17/34; G01S 7/4876; G01S 7/499; G01S 13/34; G01S 13/428; G01S 17/006; G01S 17/02; G01S 17/48; G01S 17/66; G01S 17/95; G01S 19/13; G01S 19/42; G01S 2013/9318; G01S 2013/93185; G01S 2013/9319; G01S 2013/9324; G01S 2013/93275; G01S 7/403; G01S 7/4034; G01S 7/417; G01S 7/4914; G01S 13/885; G01S 15/87; G01S 17/003; G01S 17/32; G01S 2007/52007; G01S 2015/938; G01S 7/4039; G01S 7/4818; G01S 7/491; G01S 7/4911; G01S 7/4913; G01S 7/527; G01S 11/12; G01S 13/42; G01S 13/50; G01S 13/872; G01S 13/874; G01S 13/89; G01S 13/9076; G01S 13/93; G01S 17/36; G01S 17/46; G01S 17/50; G01S 17/90; G01S 17/93; G01S 17/933; G01S 19/01; G01S 2007/4977; G01S 2015/932; G01S 7/003; G01S 7/027; G01S 7/04; G01S 7/4004; G01S 7/4043; G01S 7/4086; G01S 7/48; G01S 7/483

See application file for complete search history.

(56) References Cited

FOREIGN PATENT DOCUMENTS

| | | | |
|---|---|---|---|
| JP | 2004-198159 A | 7/2004 | |
| JP | 2007-163258 A | 6/2007 | |
| JP | 2008-215912 A | 9/2008 | |
| JP | 2010-097488 A | 4/2010 | |
| JP | 2010-249613 A | 11/2010 | |
| WO | WO-2016199379 A1 * | 12/2016 | ............ B60W 10/04 |
| WO | WO-2022114455 A1 * | 6/2022 | |

* cited by examiner

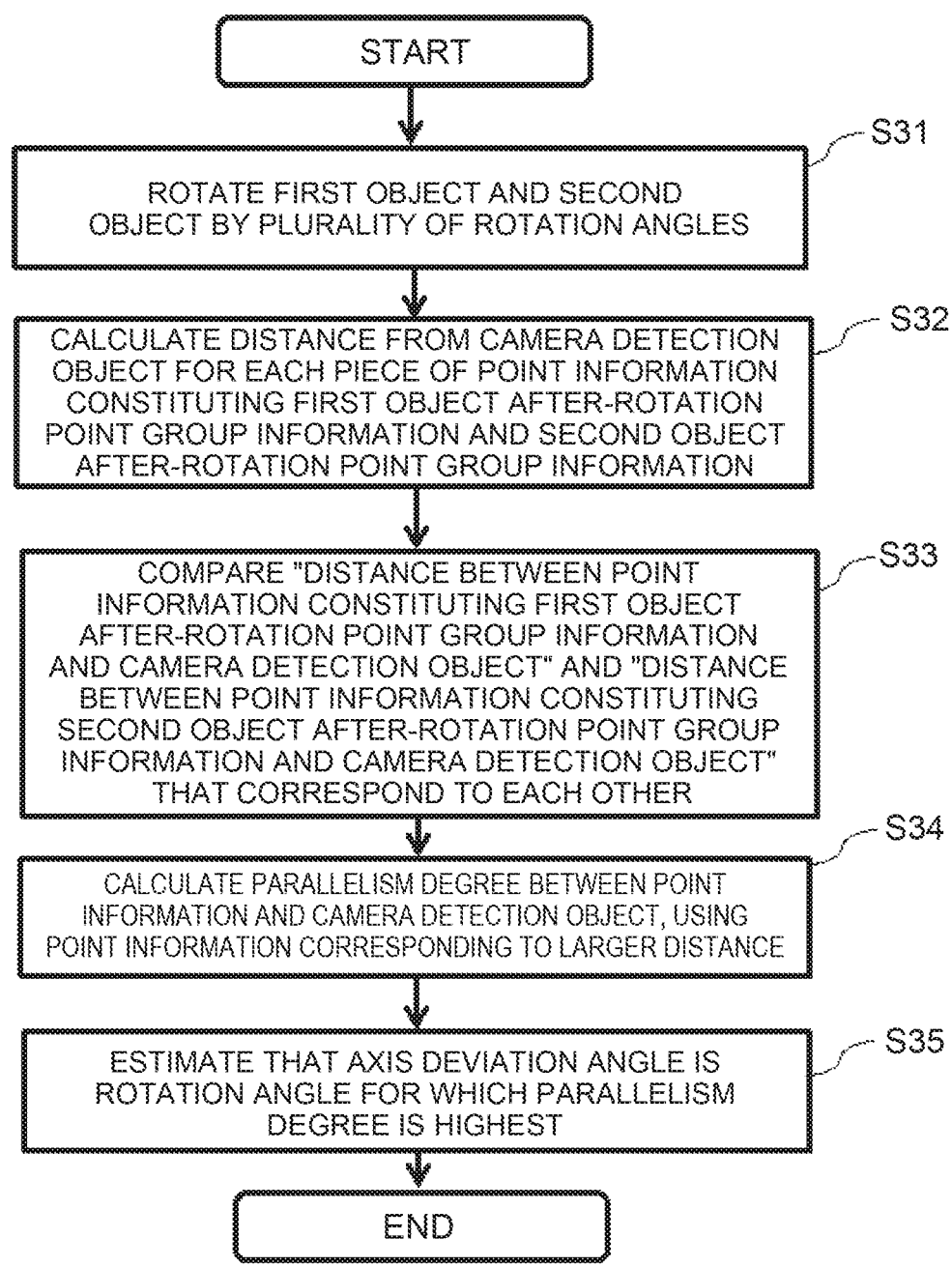

AXIS DEVIATION DETECTION DEVICE FOR ON-BOARD LIDAR

CROSS-REFERENCE TO RELATED APPLICATIONS

This application claims priority to Japanese Patent Application No. 2019-039978 filed on Mar. 5, 2019, which is incorporated herein by reference in its entirety including the specification, drawings and abstract.

BACKGROUND

1. Technical Field

The disclosure relates to an axis deviation detection device for an on-board LIDAR (Laser Imaging Detection and Ranging).

2. Description of Related Art

Conventionally, there is known a technology of detecting an axis deviation (herein, the axis deviation means the deviation of a detection axis of the LIDAR from a vehicle center axis) of an on-board LIDAR using a mobile vector of a surrounding stationary body at the time of straight traveling of a vehicle, as described in Japanese Patent Application Publication No. 2004-198159 (JP 2004-198159 A). Specifically, the technology uses the fact that the mobile vector of the surrounding stationary body at the time of straight traveling of the vehicle is oriented in the opposite direction of a vehicle movement direction in the case where there is no axis deviation of the LIDAR. Further, in the case where the mobile vector at the time of straight traveling of the vehicle is oriented in a diagonal direction with respect to the vehicle movement direction, it is estimated that there is an axis deviation of the LIDAR. Furthermore, it is disclosed that an axis deviation angle is estimated from the angle between the mobile vector and the vehicle movement direction. Further, as described in Japanese Patent Application Publication No. 2010-097488 (JP 2010-097488 A), the LIDAR is generally disposed in the exterior of a vehicle cabin.

SUMMARY

However, in the technology described in JP 2004-198159 A, in the case where the vehicle is not traveling in a straight line, it is not possible to compare the mobile vector of the surrounding stationary body and the vehicle movement direction, and therefore it is not possible to detect the axis deviation. The axis deviation of the LIDAR is desired to be found early because the axis deviation of the LIDAR influences safety of vehicle control and is desired to be detected even when the vehicle is in a stop state or the vehicle is traveling on a curved road, in other words, without depending on vehicle behavior. Further, in the case where the LIDAR is disposed in the exterior of the vehicle cabin as described in JP 2010-097488 A, the axis deviation of the LIDAR easily occurs particularly due to a contact with an obstacle, a collision with a small stone thrown up by the own vehicle or another vehicle, or the like.

Hence, the disclosure has an object to provide an axis deviation detection device for an on-board LIDAR that can accurately detect the axis deviation of the LIDAR disposed in the exterior of the vehicle cabin of the vehicle, without depending on vehicle behavior.

An axis deviation detection device for an on-board LIDAR according to the disclosure is an axis deviation detection device for an on-board LIDAR, the axis deviation detection device detecting an axis deviation of a LIDAR that is mounted on a vehicle, the axis deviation detection device including: a first detection unit that detects a first object from pickup information, the pickup information being acquired by a camera that is disposed in an interior of a vehicle cabin of the vehicle; a second detection unit that detects a second object from point information, the point information being acquired by the LIDAR that is disposed in an exterior of the vehicle cabin of the vehicle; and an axis deviation angle estimation unit that estimates an axis deviation angle of the LIDAR with respect to the camera, in which the axis deviation angle estimation unit estimates that the axis deviation angle of the LIDAR with respect to the camera is a predetermined angle, in a case where a result of comparison between a detection result of the first detection unit and an after-rotation detection result satisfies a predetermined condition, the after-rotation detection result being a result from rotating a detection result of the second detection unit by the predetermined angle about an attachment position of the LIDAR on the vehicle.

The above axis deviation detection device for the on-board LIDAR detects the axis deviation of the LIDAR, by comparing the detection result of the LIDAR with the detection result of the camera. With this configuration, it is possible to estimate the axis deviation angle without depending on vehicle behavior, and therefore it is possible to accurately detect the axis deviation of the LIDAR even when the vehicle is in a stop state or the vehicle is traveling on a curved road. Furthermore, the axis deviation angle of the LIDAR, in which there is a relatively high possibility of occurrence of the axis deviation because the LIDAR is disposed in the exterior of the vehicle cabin of the vehicle is estimated on the basis of the camera, in which there is a relatively low possibility of occurrence of the axis deviation because the camera is disposed in the interior of the vehicle cabin of the vehicle. Therefore, the calculated "axis deviation angle of the LIDAR with respect to the camera" is closer to the "axis deviation angle of the LIDAR with respect to a vehicle center axis", leading to contribution to enhancement of accuracy of the axis deviation angle estimation.

The axis deviation detection device for the on-board LIDAR according to the disclosure may further include an object relation determination unit that determines whether the first object and the second object satisfy a predetermined relation, in which the axis deviation angle estimation unit estimates that the axis deviation angle of the LIDAR with respect to the camera is the predetermined angle, in a case where the object relation determination unit determines that the first object and the second object are identical and where the predetermined condition is a condition that a coincidence degree between the detection result of the first detection unit and the after-rotation detection result is equal to or higher than a coincidence degree threshold.

With the above configuration, in the case where a physical body detected by the camera and a physical body detected by the LIDAR are identical and where the coincidence degree between the after-rotation detection result from rotating the detection result of the LIDAR and the detection result of the camera is equal to or higher than the coincidence degree threshold, it is estimated that the axis deviation angle is the rotation angle of the detection result of the LIDAR, and therefore the above configuration contributes to an accurate estimation of the axis deviation angle without depending on vehicle behavior.

In the axis deviation detection device for the on-board LIDAR according to the disclosure, the coincidence degree may be calculated so as to be a high degree in a case where a sum of a distance is small, in comparison between the case where the sum of the distance is small and a case where the sum of the distance is large, the distance being a distance between the detection result of the first detection unit and the point information constituting the after-rotation detection result.

With the above configuration, using the sum of the distance between the after-rotation detection result from rotating the detection result of the LIDAR and the detection result of the camera, the coincidence degree is calculated so as to be a high degree in the case where the sum of the distance is small, in the comparison between the case where the sum of the distance is small and the case where the sum of the distance is large. Thereby, particularly, in the case where the physical body detected by the camera and the physical body detected by the LIDAR are identical, the above configuration contributes to the accurate estimation of the axis deviation angle without depending on vehicle behavior.

In the axis deviation detection device for the on-board LIDAR according to the disclosure, each of the first object and the second object may be a white line drawn on a road.

The above configuration uses the white line, which is easily detected from the vehicle in many road surface conditions, and thereby contributes to the accurate estimation of the axis deviation angle without depending on vehicle behavior even when the vehicle is in the stop state or the vehicle is traveling on the curved road.

The axis deviation detection device for the on-board LIDAR according to the disclosure may further include an object relation, determination unit that determines whether the first object and the second object satisfy a predetermined relation, in which the axis deviation angle estimation unit estimates that the axis deviation angle of the LIDAR with respect to the camera is the predetermined angle, in a case where the object relation determination unit determines that the first object and the second object are not identical and where the predetermined condition is a condition that a parallelism degree between the detection result of the first detection unit and the after-rotation detection result is equal to or higher than a parallelism degree threshold.

With the above configuration, in the case where the physical body detected by the camera and the physical body detected by the LIDAR are different objects (for example, a case where the physical body detected by the camera is a white line and the physical body detected by the LIDAR is a roadside body parallel to the white line, or a case where the physical body detected by the LIDAR is unknown) and where the parallelism degree between the after-rotation detection result from rotating the detection result of the LIDAR and the detection result of the camera is equal to or higher than the parallelism degree threshold, it is estimated that the axis deviation angle is the rotation angle of the detection result of the LIDAR, and therefore the above configuration contributes to the accurate estimation of the axis deviation angle without depending on vehicle behavior.

In the axis deviation detection device for the on-board LIDAR according to the disclosure, the parallelism degree may be calculated so as to be to a high degree in a case where a change amount of a distance is small, in comparison between the case where the change amount of the distance is small and a case where the change amount of the distance is large, the distance being a distance between the detection result of the first detection unit and the point information constituting the after-rotation detection result.

With the above configuration, using the change amount of the distance between the after-rotation detection result from rotating the detection result of the LIDAR and the detection result of the camera, the parallelism degree is calculated so as to be a high degree in the case the change amount of the distance is small, in the comparison between the case where the change amount of the distance is small and the case where the change amount of the distance is large. Thereby, particularly, in the case where the physical body detected by the camera and the physical body detected by the LIDAR are different physical bodies, the above configuration contributes to the accurate estimation of the axis deviation angle without depending on vehicle behavior.

In the axis deviation detection device for the on-board LIDAR according to the disclosure, the first object may be a white line drawn on a road, and the second object may be a roadside body parallel to the white line.

The above configuration uses the white line, which is easily detected from the vehicle in many road surface conditions, and the roadside body parallel to the white line, and thereby contributes to the accurate estimation of the axis deviation angle without depending on vehicle behavior even when the vehicle is in the stop state or the vehicle is traveling on the curved road.

In the axis deviation detection device for the on-board LIDAR according to the disclosure, the distance may be a distance between the point information constituting the after-rotation detection result and an intersection point of a perpendicular line dropped from the point information to the detection result of the first detection unit and the detection result of the first detection unit.

With the above configuration, it is possible to appropriately calculate the coincidence degree or the parallelism degree. Therefore, the above configuration further contributes to the accurate estimation of the axis deviation angle without depending on vehicle behavior.

With the disclosure, it is possible to provide the axis deviation detection device for the on-board LIDAR that can accurately detect the axis deviation of the LIDAR without depending on vehicle behavior.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 19 is a flowchart showing a process according to the modification of the second embodiment.

DETAILED DESCRIPTION OF EMBODIMENTS

First Embodiment

An embodiment of the disclosure will be described with reference to the accompanying drawings.

Figure 1:
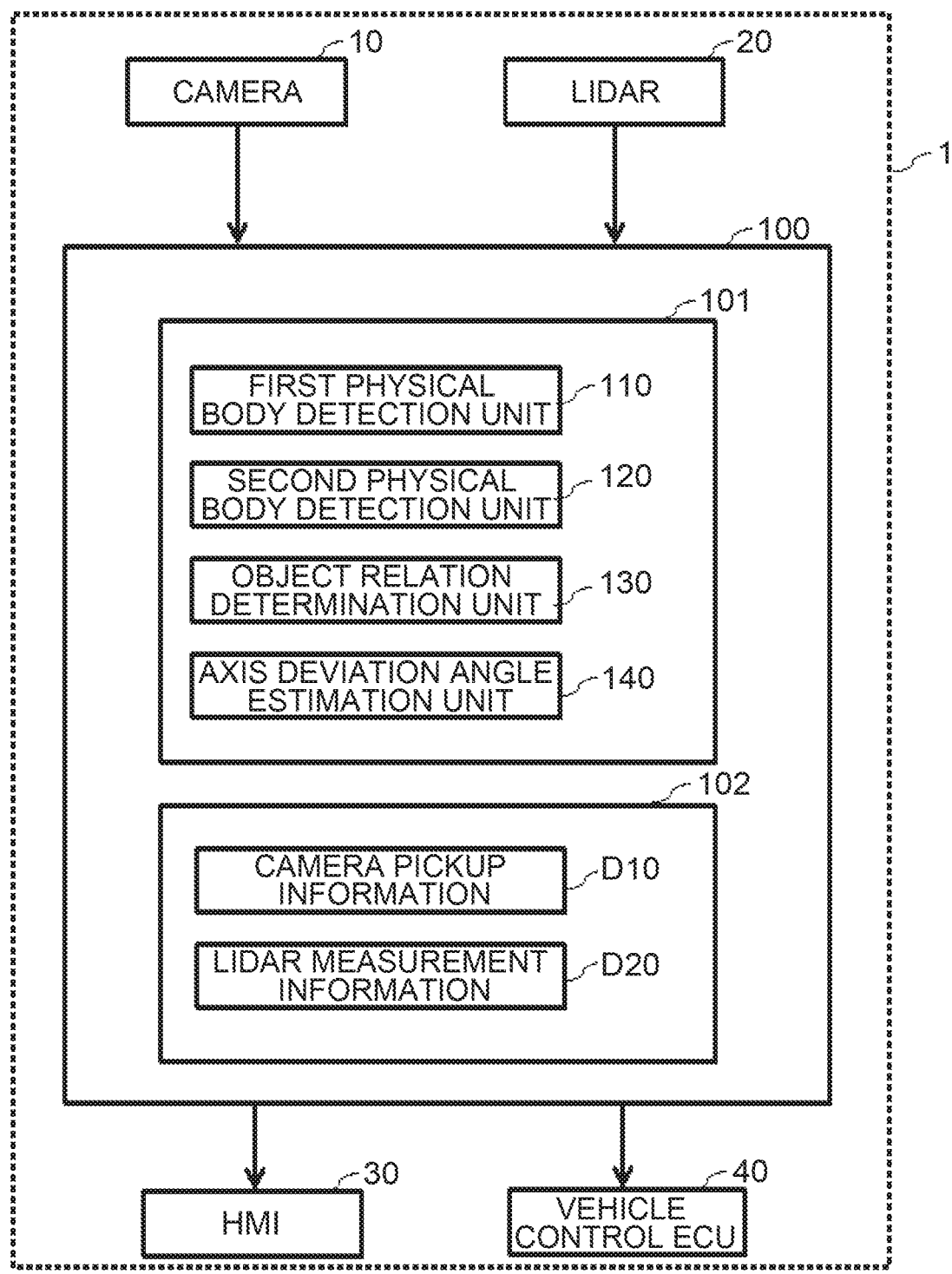
FIG. 1 is a block diagram showing a configuration of an assist control system according to a first embodiment.

FIG. 1 is a block diagram showing a configuration example of an axis deviation detection device 100 according to the embodiment. The axis deviation detection device 100 detects the axis deviation of a LIDAR 20 from a camera 10, based on a pickup result obtained by the camera 10 and a measurement result obtained by the LIDAR 20. The axis deviation detection device 100 is mounted on a vehicle 1.

The camera 10 picks up the periphery of the vehicle 1. Camera pickup information D10 is image information indicating the pickup result obtained by the camera 10.

The LIDAR 20 is a remote sensing device that measures the position (distance and direction) of a physical body, using a laser pulse. More specifically, the LIDAR 20 sequentially outputs the laser pulse in a plurality of directions (scanning). The laser pulse is reflected at a reflection point on the physical body, and then the reflected light of the laser pulse returns to the LIDAR 20. The LIDAR 20 can calculate the distance and direction of the reflection point, from a light receiving condition of the reflected light. A point group is an aggregation of reflection points that are measured by the LIDAR 20. LIDAR measurement information D20 is information indicating the measurement result obtained by the LIDAR 20, that is, the position (distance and direction) of the point group.

The physical body in the periphery of the vehicle 1 can be recognized based on at least one of the camera pickup information and the LIDAR measurement information. For example, a white line located forward of the vehicle 1, or a roadside body (a curbstone, a guardrail or the like) parallel to the white line can be recognized. The result of the recognition of the physical body is used for traveling control of the vehicle 1.

The camera 10 and the LIDAR 20 are separately provided (details will be described later). Further, the field of view of the camera 10 and the field of view of the LIDAR 20 overlap with each other at least partially. Accordingly, an identical physical body can be recognized by both of the camera 10 and the LIDAR 20.

Next, the axis deviation of the LIDAR 20 will be described. The axis deviation of the LIDAR means that the attitude of the LIDAR changes from a reference state (a state where the axis deviation has not occurred). The axis deviation can occur due to aging degradation of a fixing member such as a screw for fixing the LIDAR 20 to the vehicle, a contact of the LIDAR 20 with a physical body, or the like. The "contact with a physical body" includes a contact with a small stone or the like thrown up by the own vehicle or another vehicle (regardless of whether the vehicle is in a traveling state or in a stop state), in addition to a collision of the own vehicle with another vehicle and a collision of the own vehicle with a roadside body. The axis deviation of the LIDAR 20 includes the axis deviation in the horizontal direction and the axis deviation in the vertical direction. In the embodiment, the axis deviation in the horizontal direction will be described. This is because a resolution power in the horizontal direction of the LIDAR 20 is generally higher than a resolution power in the vertical direction, and a required recognition accuracy in the horizontal direction is higher than a required recognition accuracy in the vertical direction. In the embodiment, the axis deviation of the LIDAR 20 from the camera 10 is detected.

In the case of occurrence of the axis deviation of the LIDAR 20, a "measurement position" when the physical body in the exterior of the vehicle 1 is measured from the vehicle 1, which is a position to be used for vehicle control, deviates from the actual position. This causes a decrease in the recognition accuracy for the physical body. As an example, in the case of the occurrence of the axis deviation of the LIDAR 20, a physical body (for example, a stopped vehicle on a road shoulder) that actually exists on the right side of the movement direction of the vehicle 1 is falsely recognized as a physical body that exists in the movement direction of the vehicle 1. Such a false recognition causes a decrease in the accuracy of the vehicle traveling control based on the recognition result, and is undesirable.

In the embodiment, the camera 10 is provided on the inside of a vehicle cabin of the vehicle 1, and the LIDAR 20 is attached to the outside of the vehicle cabin of the vehicle 1 (for example, a bumper or a vehicle root). In this case, it can be said that the LIDAR 20 has a relatively high possibility of the occurrence of the axis deviation due to the contact of the vehicle 1 with the physical body compared to the camera 10. On the other hand, as for the camera 10 provided on the inside of the vehicle cabin, the relative position relation to the vehicle 1 changes hardly. Particularly, in the case where the camera 10 is fixed to a windshield of the vehicle 1, the relative position relation to the vehicle 1 changes hardly. Accordingly, in the embodiment, by estimating the axis deviation of the LIDAR 20 on the basis of the camera 10, it is possible to estimate the axis deviation of the LIDAR 20 from a vehicle center axis, substantially (assuming that there is no axis deviation of an optical axis of the camera 10 from the vehicle center axis).

Hence, the embodiment provides a technology that allows the detection of the axis deviation of the LIDAR 20 mounted on the vehicle 1 from the camera 10.

As shown in FIG. 1, the axis deviation detection device 100 includes a processor 101 and a storage device 102. The processor 101 performs a variety of processes by executing computer programs. In the storage device 102, a variety of information is stored.

For example, the processor 101 acquires the camera pickup information D10 from the camera 10 and stores the camera pickup information D10 in the storage device 102. The camera pickup information D10 is image data indicating the pickup result obtained by the camera 10 and indicates a situation in the periphery of the vehicle 1 that is picked up by the camera 10.

The processor 101 acquires the LIDAR measurement information D20 from the LIDAR 20 and stores the LIDAR measurement information D20 in the storage device 102. The LIDAR measurement information D20 is information indicating the measurement result obtained by the LIDAR 20 and indicates the position of the point group relative to the vehicle 1 that is measured by the LIDAR 20.

The processor 101 performs an "axis deviation determination process" for determining whether the axis deviation has occurred, based on the camera pickup information D10 and the LIDAR measurement information D20.

FIG. 1 is a block diagram showing a functional configuration example related to the axis deviation determination process according to the embodiment. The axis deviation detection device 100 (the processor 101) includes a first physical body detection unit 110, a second physical body detection unit 120, an object relation determination unit 130 and an axis deviation angle estimation unit 140, as functional blocks. The functional blocks are realized when the processor 101 executes computer programs stored in the storage device 102.

The first physical body detection unit 110 detects the physical body in the periphery of the vehicle 1, based on the camera pickup information D10. In the embodiment, particularly, the first physical body detection unit 110 detects a white line as the physical body in the periphery. For the detection of the white line based on the camera pickup information D10, a known method can be used. Specifically, the detection of the white line may be performed by matching with a template such as a curve model, or may be performed by a technique such as Hough transform. Further, a condition that the luminance value is equal to or higher than a threshold, or a condition that there is a predetermined continuity may be adopted. Hereinafter, the physical body that is detected based on the camera pickup information D10 is referred to as a "camera detection object CO".

The second physical body detection unit 120 detects the physical body in the periphery of the vehicle 1, based on the LIDAR measurement information D20. The LIDAR measurement information D20 is point group information. For the recognition of the object based on the LIDAR measurement information D20, a known method can be used. Specifically, when the reflection intensity of the laser pulse is equal to or higher than a predetermined value or when a spot having a reflection intensity equal to or higher than the predetermined value continues for a predetermined distance, the second physical body detection unit 120 may recognize that there is an object at the spot. In addition, the color of the object, particularly, white color may be determined based on the luminance of the object.

By the above technique, the second physical body detection unit 120 can detect the white line or the roadside body (a curbstone or a guardrail) parallel to the white line, from the LIDAR measurement information D20. Furthermore, in discrimination of the type (the white line or the roadside body parallel to the white line) of the object, the second physical body detection unit 120 may estimate that the object is the white line, based on information indicating that the height of the object from the road surface is smaller than a predetermined value, that is, the object exists near the road surface. Further, the second physical body detection unit 120 may estimate that the object is the roadside body parallel to the white line, based on information indicating that the height of the object from the road surface is larger than the predetermined value, that is, the object does not exist near the road surface. Hereinafter, a group of point group information that is detected as the physical body based on the LIDAR measurement information D20 is referred to as a "LIDAR detection object LO". In the embodiment, there is a possibility that the axis deviation of the LIDAR occurs not only in the horizontal direction but also in the vertical direction. However, the axis deviation in the vertical direction does not influence the above method because the distance from the road surface to the object in the vertical direction in the LIDAR measurement information D20 does not change.

The object relation determination unit 130 determines whether the camera detection object CO detected by the first physical body detection unit 110 and the LIDAR detection object LO detected by the second physical body detection unit 120 have a predetermined relation. The predetermined relation includes a relation of "the camera detection object CO and the LIDAR detection object LO are identical" and a relation of "the camera detection object CO and the LIDAR detection object LO are not identical". In comparison of the position relation between the camera detection object CO and the LIDAR detection object LO, various known methods can be employed. For example, it is possible to compare the detection result of the camera 10 and the detection result of the LIDAR 20 in an identical coordinate system, by correcting a coordinate system fixed in the LIDAR 20 using a coordinate system fixed in the camera 10 and the relative position relation (already known) between the camera 10 and the LIDAR 20.

A case where it is estimated that the camera detection object CO and the LIDAR detection object LO are an identical white line will be described as an example of the relation of "the camera detection object CO and the LIDAR detection object LO are identical". In the case where the camera detection object CO is recognized as a white line and the LIDAR detection object LO is recognized as a white line by the above-described method and where the distance between the camera detection object CO and the vehicle 1 and the distance between the LIDAR detection object LO and the vehicle 1 are within a first predetermined distance, it is estimated that the camera detection object CO and the LIDAR detection object LO are an identical white line. Alternatively, in the case where the camera detection object CO is recognized as a white line and the LIDAR detection object LO is recognized as a white line and where the direction of the camera detection object CO with respect to the vehicle 1 (the angle with respect to the vehicle center axis) and the direction of the LIDAR detection object LO with respect to the vehicle 1 (the angle with respect to the vehicle center axis) are within a first predetermined range, it is estimated that the camera detection object CO and the LIDAR detection object LO are an identical white line.

The case where the object relation determination unit 130 determines that there is a relation of "the camera detection object CO and the LIDAR detection object LO are not identical" will be described later in a second embodiment and a modification of the second embodiment.

The case where the object relation determination unit 130 determines that the camera detection object CO detected by the first physical body detection unit 110 and the LIDAR detection object LO detected by the second physical body detection unit 120 are identical will be described below.

The axis deviation angle estimation unit 140 estimates the axis deviation angle of the LIDAR 20, based on the camera detection object CO and the LIDAR detection object LO that are determined to have the relation of "identical" by the object relation determination unit 130. Specific contents will be described below.

In the embodiment, the axis deviation angle estimation unit 140 estimates the axis deviation angle of the LIDAR 20, based on the "coincidence degree" between the camera detection object CO and the LIDAR detection object LO. As a specific calculation method for the coincidence degree, the distance between the point group (point information P1 to P5 in FIG. 2) constituting the LIDAR detection object LO, which is a point group detected from the LIDAR measurement information D20, and the camera detection object CO, or the sum of the distance can be used.

Figure 2:
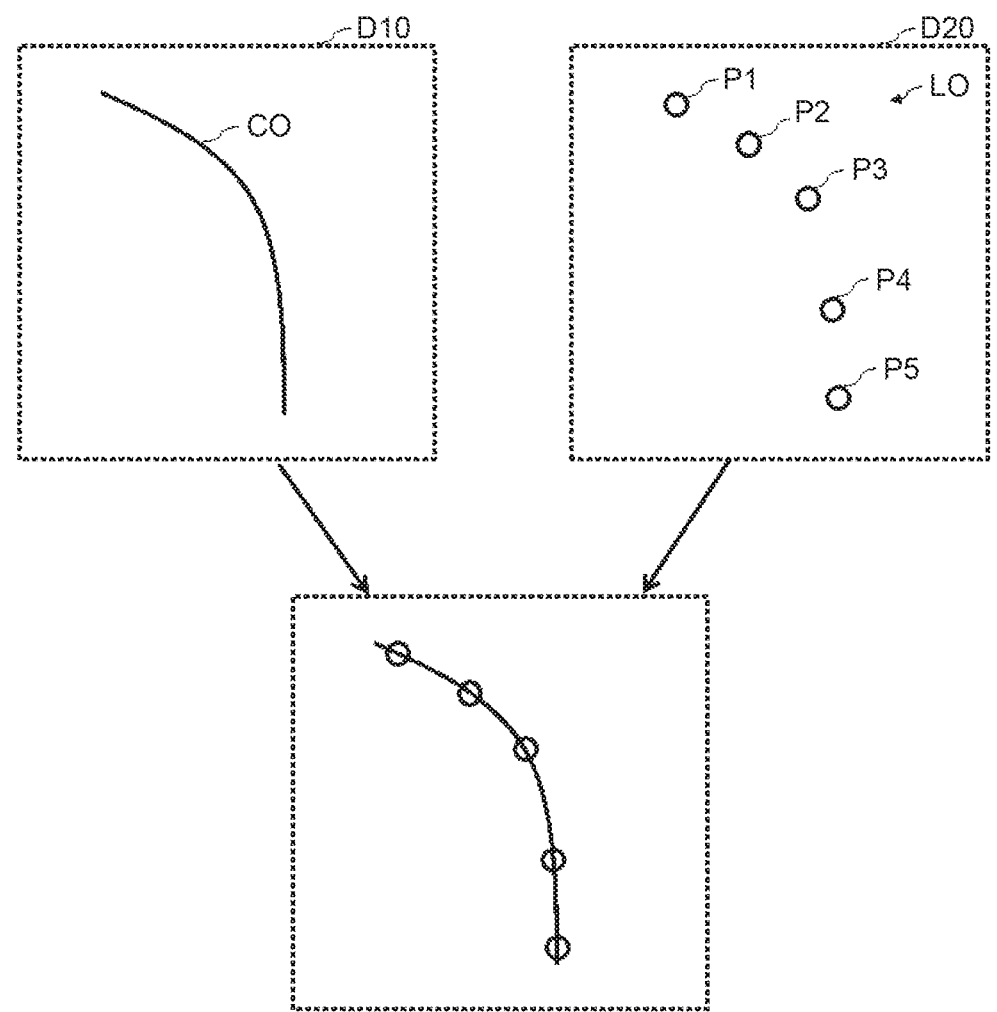
FIG. 2 is a schematic diagram showing a camera detection object and a LIDAR detection object when there is no axis deviation of a LIDAR.
Figure 3:
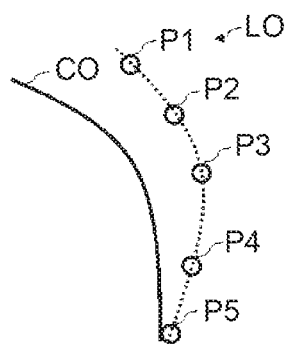
FIG. 3 is a schematic diagram showing the camera detection object and the LIDAR detection object when there is an axis deviation of the LIDAR.
Figure 4A:
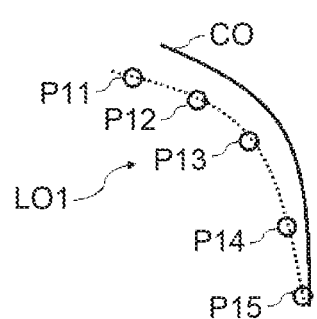
FIG. 4A is a schematic diagram showing a comparison between after-rotation point group information after the LIDAR detection object is rotated by a certain rotation angle and the camera detection object.
Figure 4B:
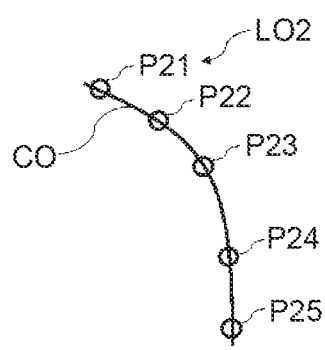
FIG. 4B is a schematic diagram showing a comparison between after-rotation point group information after the LIDAR detection object is rotated by a different rotation angle from that in FIG. 4A and the camera detection object.
Figure 4C:
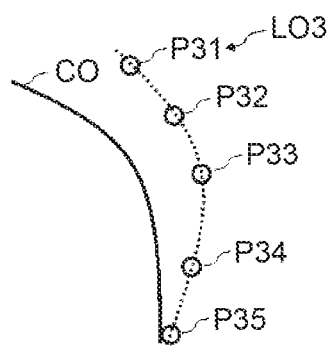
FIG. 4C is a schematic diagram showing a comparison between after-rotation point group information after the LIDAR detection object is rotated by a different rotation angle from those in FIGS. 4A and 4B and the camera detection object.
Figure 4D:
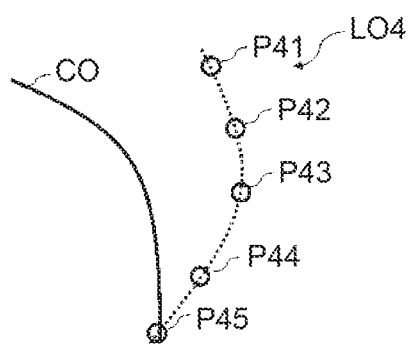
FIG. 4D is a schematic diagram showing a comparison between after-rotation point group information after the LIDAR detection object is rotated by a different rotation angle from those in FIGS. 4A to 4C and the camera detection object.
Figure 4E:
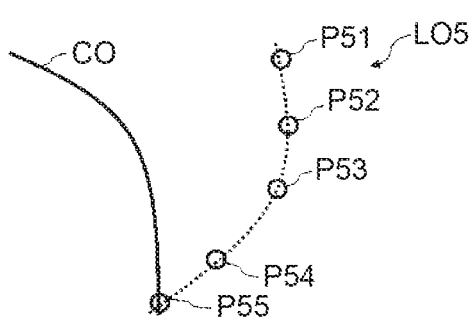
FIG. 4E is a schematic diagram showing a comparison between after-rotation point group information after the LIDAR detection object is rotated by a different rotation angle from those in FIGS. 4A to 4D and the camera detection object.

In a state where there is no axis deviation of the LIDAR 20, the camera detection object CO and the LIDAR detection object LO coincide, as shown in a lower part of FIG. 2. On the other hand, in a state where there is an axis deviation (an axis deviation from the camera 10) of the LIDAR 20, the LIDAR 20 is rotated by a certain angle (axis deviation angle) with respect to the camera 10, and therefore the camera detection object CO and the LIDAR detection object LO do not coincide, as shown in FIG. 3. In the embodiment, the LIDAR detection object LO is rotated by a predetermined angle, and then is compared with the camera detection object CO. The "rotation" described hereinafter is just a concept for calculation or processing, and does not mean a physical rotation of a physical body or the like. In some embodiments, the rotation center of the "rotation" described hereinafter may be the attachment position of the LIDAR 20 on the vehicle 1. This is because the object to be observed is detected as an object rotated about the attachment position of the LIDAR 20 on the vehicle 1 in the case of the axis deviation of the LIDAR 20. Further, the rotation direction of the "rotation" described hereinafter is the horizontal direction.

Specifically, as shown in FIGS. 4A to 4E, the LIDAR detection object LO is rotated by a plurality of rotation angles θ1 to θ5. Results from rotating the LIDAR detection object LO by the rotation angles θ1 to θ5 are referred to as after-rotation point group information LO1 to LO5, respectively. Pieces of after-rotation point information constituting the after-rotation point group information LO1 are denoted by P11 to P15 (see FIG. 4A). Similarly, pieces of after-rotation point information constituting the after-rotation point group information LO2 to LO5 are denoted by P21 to P25, P31 to P35, P41 to P45, and P51 to P55, respectively (see FIGS. 48 to 4E). In each of FIGS. 4A to 4E, for convenience of description, the rotation angle is illustrated so as to be larger than the actual rotation angle.

Figure 5A:
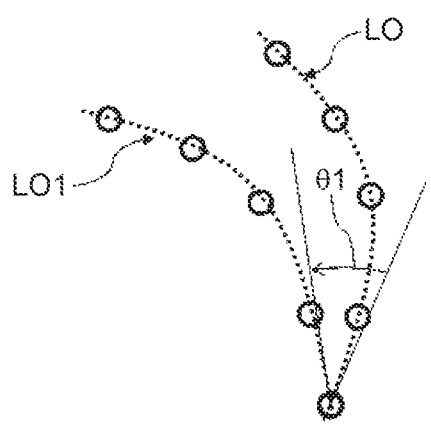
FIG. 5A is a schematic diagram showing an example of the rotation angle.
Figure 5B:
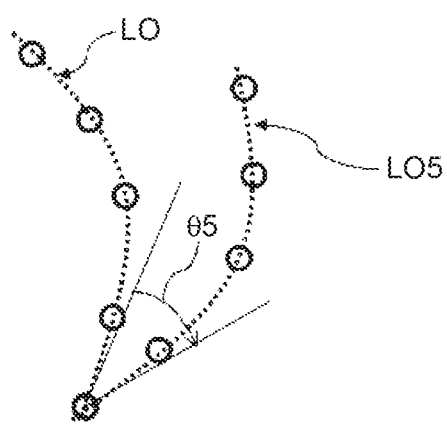
FIG. 5B is a schematic diagram showing an example of the rotation angle.

Next, the rotation angles θ1 to θ5 will be described with use of FIGS. 5A and 58. The rotation angles θ1 to θ5 are signed values. For example, the rotation angle θ1 can be set to −10 degrees, the rotation angle 82 can be set to −5 degrees, the rotation angle θ3 can be set to 0 degrees (that is, no rotation), the rotation angle θ4 can be set to −5 degrees, and the rotation angle θ5 can be set to +10 degrees (each angle is written by the degree measure). For example, as shown in FIG. 5A, the rotation angle is decided such that the angle between a tangent line drawn from a predetermined position of the LIDAR detection object LO before the rotation and a tangent line drawn from a predetermined position of the after-rotation point group information LO1 after the rotation is the rotation angle θ1. FIG. 5A shows the after-rotation point group information LO1 after the rotation by a rotation angle (θ1) having a negative value, as an example, and FIG. 5B shows the after-rotation point group information LO5 after the rotation by a rotation angle (θ5) having a positive value, as an example. The rotation angles are candidate values of the axis deviation angle (described later), and therefore the interval of the angle values can be arbitrarily set in a range in which the interval is realistic as the axis deviation angle and in which an excessive increase in calculation load is avoided.

Figure 6:
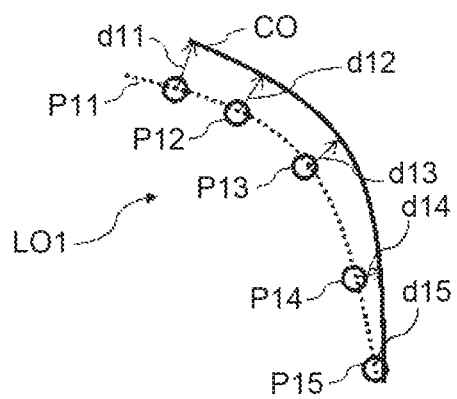
FIG. 6 is a schematic diagram showing a calculation of the distance between each piece of point information constituting the after-rotation point group information and the camera detection object.

Furthermore, the axis deviation angle estimation unit 140 calculates the distance from the camera detection object CO for each piece of point information constituting the after-rotation point group information LO1 to LO5. As shown in FIG. 6, distances calculated for the point information P11 to P15 in the after-rotation point group information LO1 are denoted by d11 to d15, respectively. Similarly, distances calculated for point information Pn1 to Pn5 in the LOn (n=1 to 5) are denoted by dn1 to dn5. The distance to be calculated can be defined as the distance between the point information (for example, the point information P11) constituting the LIDAR detection object LO and the intersection point of a perpendicular line dropped from the point information to the camera detection object CO and the camera detection object CO. The distance may be a positive value on one side with respect to the camera detection object CO, and may be a negative value on the other side. The distance can be regarded as the shortest distance between the point information and the camera detection object CO.

Furthermore, the axis deviation angle estimation unit 140 calculates the sum of the distances d11 to d15 respectively for the point information P11 to P15 in the after-rotation point group information LO1, as a distance sum d1sum. Similarly, the axis deviation angle estimation unit 140 calculates distance sums d2sum to d5sum for the point information in the after-rotation point group information LO02 to LO5.

Figure 7:
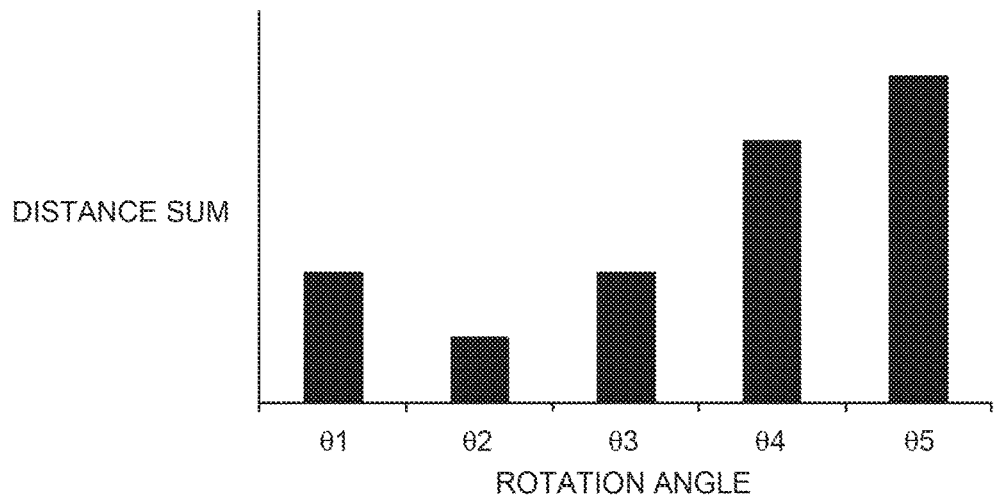
FIG. 7 is a graph showing an example of a comparison of coincidence degrees between the after-rotation point group information and the camera detection object.

FIG. 7 shows a comparison of the values of the distance sums d1sum to d5sum respectively calculated for the after-rotation point group information LO1 to LO5. The axis deviation angle estimation unit 140 estimates that the axis deviation angle is the rotation angle θ for which the value of the distance sum dsum is smallest among the distance sums d1sum to d5sum. In the above-described example, the value of the distance sum d2sum calculated for the after-rotation point group information LO2 is smallest among the distance sums d1sum to d5sum, and therefore it is found that the distance from the camera detection object CO is smallest when the LIDAR detection object LO is rotated by the rotation angle θ2. That is, it is found that the coincidence degree between the LIDAR detection object LO and the camera detection object CO is highest. Accordingly, it is estimated that the axis deviation angle of the LIDAR 20 is θ2. To be precise, it is estimated that the value closest to the real axis deviation angle among the plurality of rotation angles θ1 to θ5 is the rotation angle θ2.

Here, as the calculation method for the coincidence degree, the method of using the distance sum has been described. However, the calculation method for the coincidence degree is not limited to this method, and various methods can be employed. For example, each reciprocal of the above-described distance sums may be obtained, and the coincidence degree may be calculated such that the coincidence degree is higher as the reciprocal is larger. Further, the reciprocal may be multiplied by a predetermined value (weighting may be performed), and the coincidence degree may be calculated.

With the above configuration, it is possible to accurately detect the axis deviation of the LIDAR 20 from the camera 10 without depending on vehicle behavior.

The above process may be performed only when the LIDAR 20 can recognize the LIDAR detection object LO as the white line. Further, the above process may be performed only when it is determined that the coincidence degree between the detection result of the LIDAR detection object LO and the detection result of the camera detection object CO is below a predetermined threshold.

In the above-described embodiment, it is possible to estimate that the value closest to the real axis deviation angle is the value of θ2. For more accurately estimating the real axis deviation angle, the process in the embodiment may be performed again around θ2, at a smaller angle interval than the angle internal in the embodiment. Alternatively, an axis deviation angle detection process that is different from that in the embodiment and that requires a long calculation time and a high calculation load may be performed. In both cases, the calculation time and calculation load required for a precise estimation of the real axis deviation angle are reduced because the value of the real axis deviation angle has been limited to around θ2 by the embodiment.

After the axis deviation angle is estimated, the vehicle 1 may perform an abnormality handling process. For example, in the vehicle control after the axis deviation angle is estimated, a value (after-correction detection result) resulting from correcting the detection result of the LIDAR 20 by the axis deviation angle may be output and used, instead of the use of the detection result itself of the LIDAR 20. Further, an HMI 30 may notify a driver that the axis deviation of the LIDAR 20 has occurred, and may prompt the driver to repair the vehicle 1 or to carry the vehicle 1 to a dealer. Furthermore, in a subsequent vehicle control (a follow-up traveling control or a collision avoidance control), a vehicle control ECU 40 may perform a more careful control (a so-called degenerate control) than a normal control. Specifically, a vehicle speed limit in the follow-up traveling control may be lower than a normal vehicle speed limit, or a deceleration start timing in the collision avoidance control may be earlier than a normal deceleration start timing.

Next, processes that are executed by the axis deviation detection device 100 will be specifically described with reference to flowcharts in FIG. 8 and FIG. 9.

Figure 8:
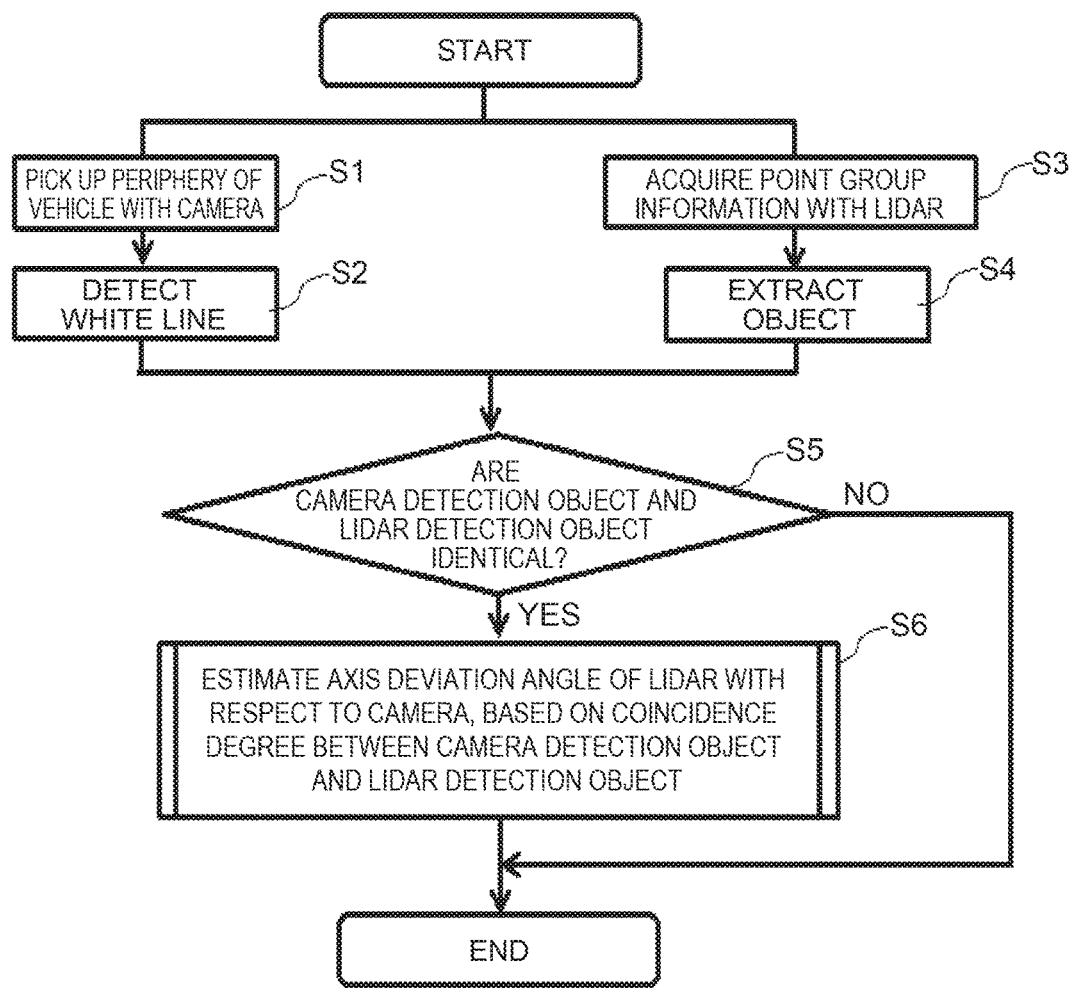
FIG. 8 is a flowchart showing a process according to the first embodiment.
Figure 9:
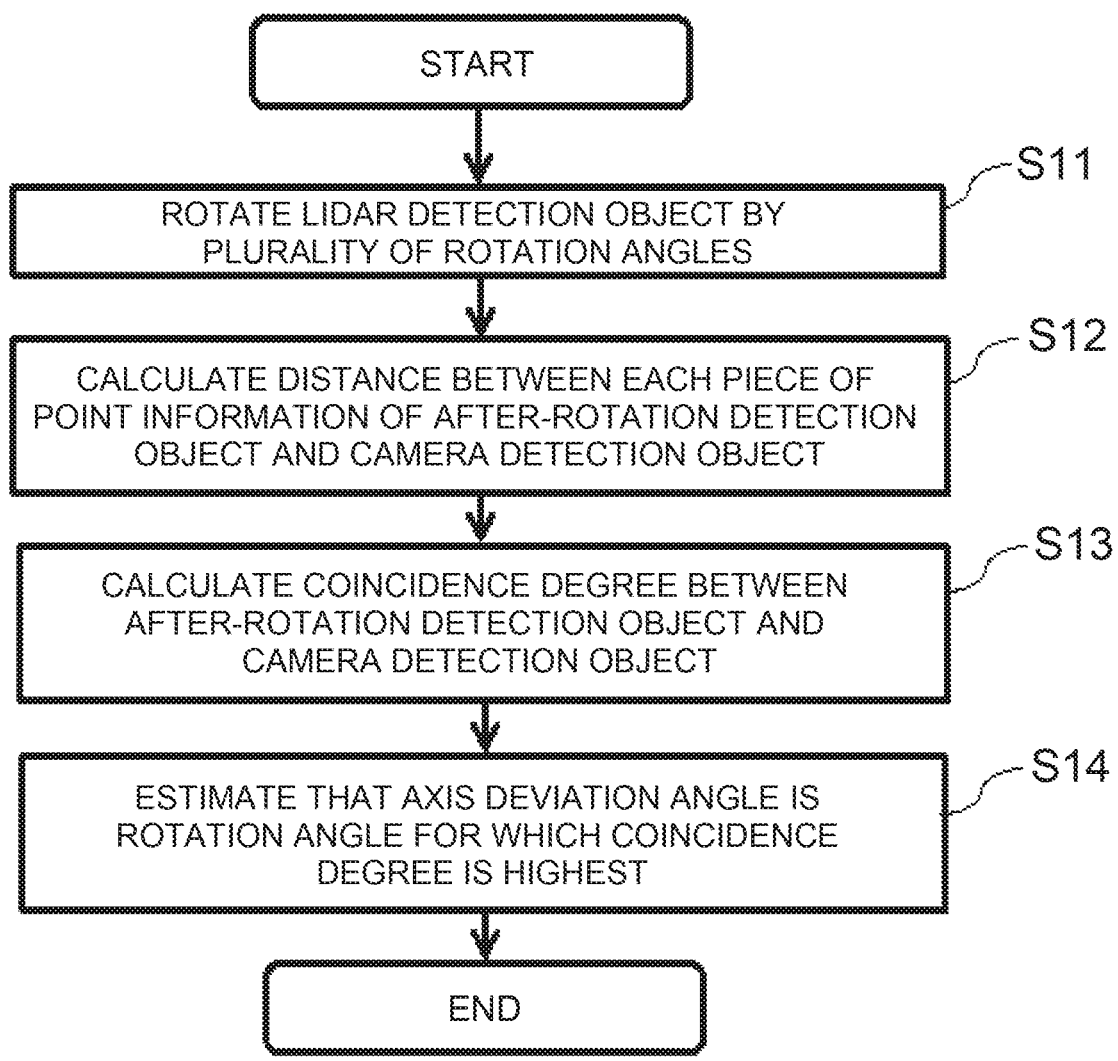
FIG. 9 is a flowchart showing a process according to the first embodiment.

FIG. 8 is a flowchart showing a process in the axis deviation detection device 100. In the axis deviation detection device 100, the processor 101 executes the flowchart as described below. In some embodiments, the flowchart in FIG. 8 may be constantly executed during the traveling of the vehicle 1. However, without being limited to this, the execution of the flowchart in FIG. 8 may be started only when a particular 15' condition is satisfied.

In S1, the camera 10 picks up the periphery of the vehicle 1. In S2, the first physical body detection unit 110 detects the physical body in the periphery of the vehicle 1, based on the camera pickup information D10. Particularly, the first physical body detection unit 110 detects the white line. Meanwhile, in S3, the LIDAR 20 acquires information about the periphery of the vehicle, as the point group information. Next, in S4, the second physical body detection unit 120 extracts the physical body (object) in the periphery of the vehicle 1, based on the LIDAR measurement information D20.

Thereafter, the process proceeds to S5. In S5, the object relation determination unit 130 determines whether the camera detection object CO detected by the first physical body detection unit 110 and the LIDAR detection object LO detected by the second physical body detection unit 120 are identical. In the case where the object relation determination unit 130 determines that the camera detection object CO and the LIDAR detection object LO are identical, the process proceeds to S6. In the case where the object relation determination unit 130 does not determine that the camera detection object CO and the LIDAR detection object LO are identical, the process ends.

In S6, the axis deviation angle estimation unit 140 estimates the axis deviation angle of the LIDAR 20 with respect to the camera 10, based on the coincidence degree between the camera detection object CO and the LIDAR detection object LO. Details will be described with the flowchart in FIG. 9. In the embodiment, S6 is constituted by S11 to S14. In S11, the axis deviation angle estimation unit 140 rotates the LIDAR detection object LO by a plurality of rotation angles. Next, in S12, the axis deviation angle estimation unit 140 calculates the distance from the LIDAR detection object CO for each piece of point information constituting the after-rotation point group information LO1 to LO5 after the LIDAR detection object LO is rotated. Next, in S13, the axis deviation angle estimation unit 140 calculates the coincidence degree between the after-rotation point group information LO1 to LO5 and the camera detection object CO, for each of the rotation angles θ1 to θ5. Specifically, the above distance sum is calculated. Next, in S14, the axis deviation angle estimation unit 140 estimates that the axis deviation angle is the rotation angle for which the coincidence degree is highest. Specifically, the axis deviation angle estimation unit 140 estimates that the axis deviation angle is the rotation angle for which the value of the distance sum is smallest.

With the above configuration, it is possible to accurately detect the axis deviation of the LIDAR 20 from the camera 10 without depending on vehicle behavior.

Second Embodiment

Next, a second embodiment will be described. The second embodiment has no difference from the first embodiment in block diagram and hardware configuration. Differences between the first embodiment and the second embodiment will be described below.

In the first embodiment, the case where the object relation determination unit 130 determines that the camera detection object CO detected by the first physical body detection unit 110 and the LIDAR detection object LO detected by the second physical body detection unit 120 are identical has been described. On the other hand, the second embodiment has a difference in that the embodiment is a technique to be applied in the case where the object relation determination unit 130 determines that the camera detection object CO detected by the first physical body detection unit 110 and the LIDAR detection object LO detected by the second physical body detection unit 120 are not identical. First, the case where the object relation determination unit 130 determines "the camera detection object CO detected by the first physical body detection unit 110 and the LIDAR detection object LO detected by the second physical body detection unit 120 are not identical" will be described.

As an example of the relation of "the camera detection object CO and the LIDAR detection object LO are not identical", there is a case where the camera detection object CO is the white line and the LIDAR detection object LO is the roadside body parallel to the white line. In the case where the camera detection object CO is recognized as a white line and the LIDAR detection object LO is recognized as a roadside body parallel to a white line by the above-described method and where the distance between the camera detection object CO and the vehicle 1 and the distance between the LIDAR detection object LO and the vehicle 1 are within a second predetermined distance, it is estimated that the camera detection object CO is the white line and the LIDAR detection object LO is the roadside body parallel to the white line. In some embodiments, the second predetermined distance may be larger than the first predetermined distance in the first embodiment. Alternatively, in the case where the camera detection object CO is recognized as a white line and the LIDAR detection object LO is recognized as a roadside body parallel to a white line and where the direction of the camera detection object CO with respect to the vehicle 1 (the angle with respect to the vehicle center axis) and the direction of the LIDAR detection object LO with respect to the vehicle 1 (the angle with respect to the vehicle center axis) are within a second predetermined range, it is estimated that the camera detection object CO is the white line and the LIDAR detection object LO is the roadside body parallel to the white line. In some embodiments, the second predetermined range may be wider than the first predetermined range in the first embodiment.

Further, as an example of the relation of "the camera detection object CO and the LIDAR detection object LO are not identical", there is a case where the camera detection object CO is recognized as a white line and the LIDAR detection object LO is recognized as a white line and where the estimation of "the camera detection object CO and the LIDAR detection object LO are an identical white line" is not made as a result of the above-described inspection with the "first predetermined distance" or the "first predetermined range". Furthermore, there is a case where the camera detection object CO is recognized as a white line and the LIDAR detection object LO is recognized as a roadside body parallel to a white line and where the estimation of "the camera detection object CO and the LIDAR detection object LO are the corresponding white line and the roadside body parallel to the white line" is not made as a result of the above-described inspection with the "second predetermined distance" or the "second predetermined range". That is, there is a case where it is found that the camera detection object CO is the white line and where the type of the LIDAR detection object LO is not found (the probability of the white line does not exceed the corresponding predetermined value and the probability of the roadside body parallel to the white line does not exceed the corresponding predetermined value). Even in this case, by a technique described below, it is possible to estimate the axis deviation of the LIDAR 20 from the camera 10.

The axis deviation angle estimation unit 140 estimates the axis deviation angle of the LIDAR 20, based on the camera detection object CO and the LIDAR detection object LO that are determined to have the predetermined relation (that is, the "relation showing that the camera detection object CO detected by the first physical body detection unit 110 and the LIDAR detection object LO detected by the second physical body detection unit 120 are not identical") by the object relation determination unit 130.

In the second embodiment, the axis deviation angle estimation unit 140 estimates the axis deviation angle of the LIDAR 20, using the position relation between the white line and the roadside body (a curbstone or a guardrail) parallel to the white line. That is, the axis deviation angle estimation unit 140 estimates the axis deviation angle of the LIDAR 20, based on the "parallelism degree" between the camera detection object CO and the LIDAR detection object LO. As a specific calculation method for the parallelism degree, similarly to the first embodiment, the distance between the point group constituting the LIDAR detection object LO, which is a point group detected from the LIDAR measurement information D20, and the camera detection object CO, or the sum of the distance can be used. In the embodiment, the point information constituting the LIDAR detection object LO is point information P1 to P5, as shown in FIG. 10.

Figure 10:
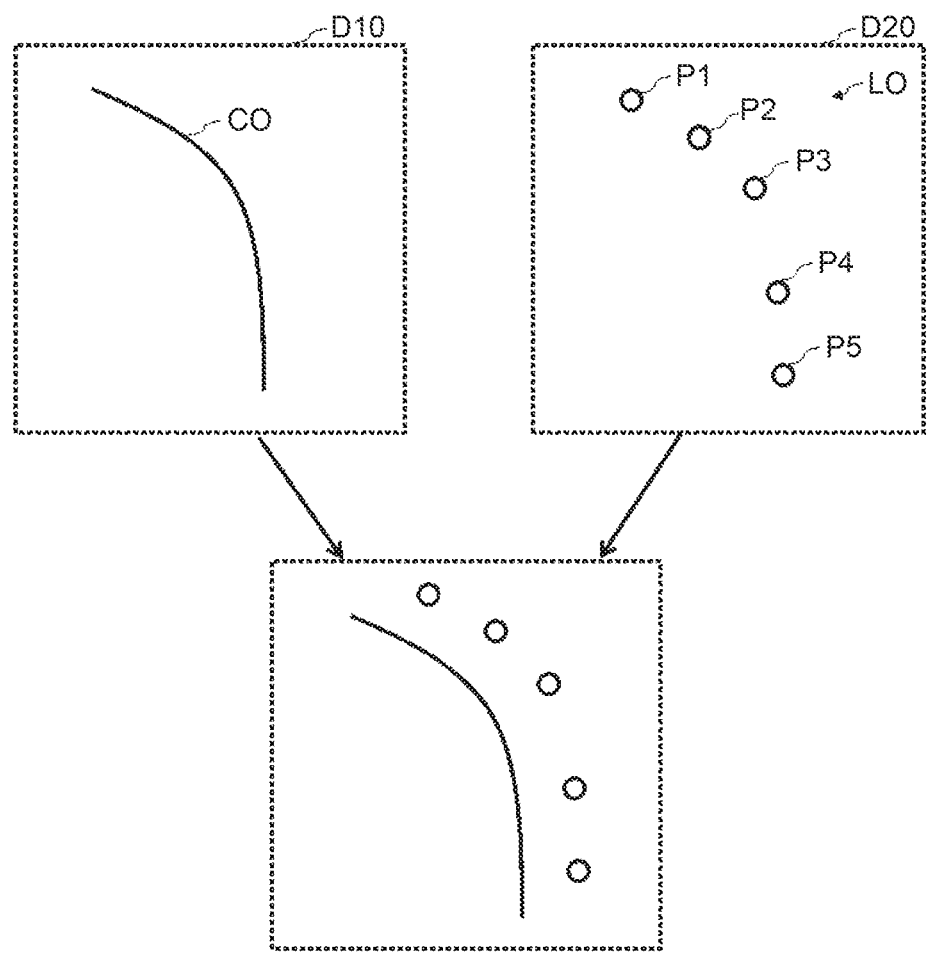
FIG. 10 is a schematic diagram showing a camera detection object and a LIDAR detection object when there is no axis deviation of the LIDAR according to a second embodiment.
Figure 11A:
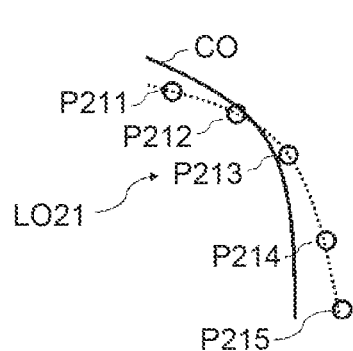
FIG. 11A is a schematic diagram showing a comparison between after-rotation point group information after the LIDAR detection object is rotated by a certain rotation angle and the camera detection object according to the second embodiment.
Figure 11B:
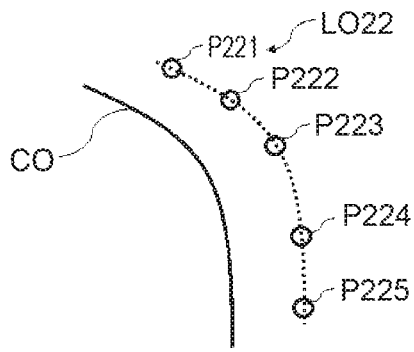
FIG. 11B is a schematic diagram showing a comparison between after-rotation point group information after the LIDAR detection object is rotated by a different rotation angle from that in FIG. 11A and the camera detection object according to the second embodiment.
Figure 11C:
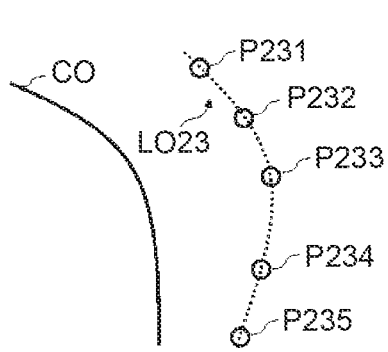
FIG. 11C is a schematic diagram showing a comparison between after-rotation point group information after the LIDAR detection object is rotated by a different rotation angle from those in FIGS. 11A and 11B and the camera detection object according to the second embodiment.
Figure 11D:
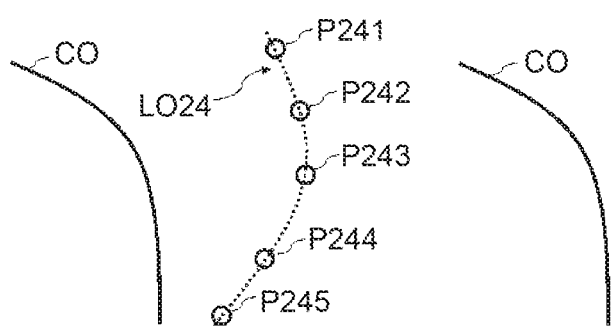
FIG. 11D is a schematic diagram showing a comparison between after-rotation point group information after the LIDAR detection object is rotated by a different rotation angle from those in FIGS. 11A to 11C and the camera detection object according to the second embodiment.
Figure 11E:
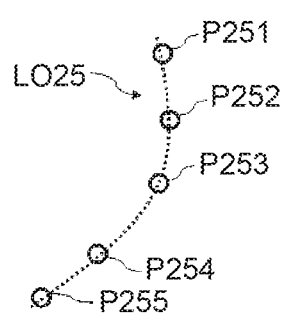
FIG. 11E is a schematic diagram showing a comparison between after-rotation point group information after the LIDAR detection object is rotated by a different rotation angle from those in FIGS. 11A to 11D and the camera detection object according to the second embodiment.

In the state where there is no axis deviation of the LIDAR 20, the position relation between the camera detection object CO and the LIDAR detection object LO is thought to be a parallel relation or a relation close to the parallel relation, as shown in FIG. 10. On the other hand, in the state where there is an axis deviation of the LIDAR 20, the LIDAR detection object LO is not parallel to the camera detection object CO. In the second embodiment, similarly to the first embodiment, the LIDAR detection object LO is rotated by a predetermined angle, and then is compared with the camera detection object CO.

Specifically, as shown in FIGS. 11A to 11E, the axis deviation angle estimation unit 140 rotates the LIDAR detection object LO by a plurality of rotation angles $\theta 21$ to $\theta 25$. Results from rotating the LIDAR detection object LO by the rotation angles $\theta 21$ to $\theta 25$ are referred to as after-rotation point group information LO21 to LO25, respectively. The rotation angles $\theta 21$ to $\theta 25$ are signed values. For example, $\theta 21$ can be set to −10 degrees, $\theta 22$ can be set to −5 degrees, $\theta 23$ can be set to 0 degrees (that is, no rotation). $\theta 24$ can be set to +5 degrees, and $\theta 25$ can be set to +10 degrees. The axis deviation angle estimation unit 140 calculates the distance from the camera detection object CO for each point group of the after-rotation point group information LO21 to LO25. For example, distances calculated for the point information P211 to P215 in the after-rotation point group information LO21 are denoted by d211 to d215, respectively. Similarly, distances calculated for point groups P2$n$1 to P2$n$5 in the after-rotation point group information LO2$n$ (n=1 to 5) are denoted by d2$n$1 to d2$n$5.

Next, the axis deviation angle estimation unit 140 calculates a parallelism degree PA1 between the camera detection object CO and the LIDAR detection object LO, by calculating a change in distance for the distances d211 to d215 about the after-rotation point group information LO21. As an amount indicating the "change in distance" for calculating the parallelism degree, the value of the variance may be used, the difference between the maximum and the minimum may be used, or information indicating whether the sign changes and the number of changes in sign may be used (described later). In the case where the axis of the LIDAR 20 with the sign of the value of the distance does not deviate from the camera 10 (the axis deviation angle of the LIDAR 20 with respect to the camera 10 is zero), it is thought that the values of the distances d211 to d215 are equal to each other or the change in distance is very small (is close to zero). Further, as the axis deviation angle of the LIDAR 20 with respect to the camera 10 is smaller, the change in distance for the distances d211 to d215 is smaller. In contrast, as the axis deviation angle of the LIDAR 20 with respect to the camera 10 is larger, the change in distance for the distances d211 to d215 is larger. Similarly, the axis deviation angle estimation unit 140 calculates a parallelism degree PA$n$ for the distances d2$n$1 to d2$n$5 about the after-rotation point group information LO2$n$ (n=1 to 5).

Figure 12A:
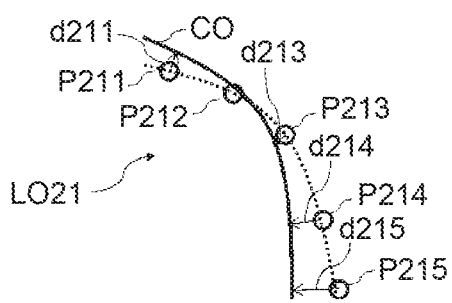
FIG. 12A is a schematic diagram showing a calculation of the distance between each piece of point information constituting the after-rotation point group information and the camera detection object according to the second embodiment.
Figure 12B:
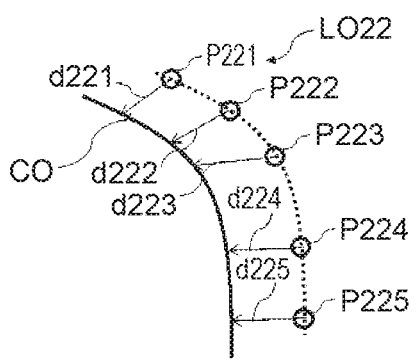
FIG. 12B is a schematic diagram showing a calculation of the distance between each piece of point information constituting the after-rotation point group information and the camera detection object according to the second embodiment.

As the calculation method for the parallelism degree, various calculation methods can be employed, if the parallelism degree is a "value that is calculated so as to be a higher value as the change in the distance between each piece of point information constituting the after-rotation point group information and the camera detection object CO is smaller". Specifically, the value of the variance of the distances d211 to d215 can be used. As the value of the variance is smaller, the change in the distance is smaller, and therefore, it can be said that the parallelism degree is higher. In contrast, as the value of the variance is larger, the change in the distance is larger, and therefore, it can be said that the parallelism degree is lower. In an example shown in FIGS. 12A and 12B, in the comparison of the after-rotation point group information LO21 and the after-rotation point group information LO22, the values (referred to as V21 and V22, respectively) of the variances of the distances d211 to d215 and the distances d221 to d225 are calculated. The value V22 of the variance for the after-rotation point group information LO22 is lower than the value V21 of the variance for the after-rotation point group information LO21, and therefore, it can be said the after-rotation point group information LO22 is higher in parallelism degree than the after-rotation point group information LO21.

Further, the difference between the maximum and minimum of the distances d211 to d215 may be used. This is because the camera detection object CO estimated to be the white line and the LIDAR detection object LO (and the after-rotation point group information LO2$n$) estimated to the roadside body parallel to the white line both are liner physical objects, so that the distance is unlikely to drastically change at a certain point and is likely to have continuous values. In the example shown in FIGS. 12A and 12B, in the comparison of the difference between the maximum (d215) and minimum (d211) of the distances d211 to d215 for the after-rotation point group information LO21 and the difference between the maximum (d225) and minimum (d221) of the distances d221 to d225 for the after-rotation point group information LO22, the latter is smaller, and therefore it can be said that the after-rotation point group information LO22 is higher in parallelism degree than the after-rotation point group information LO21.

Furthermore, information indicating whether the sign of the value of the distance changes and the number of changes in the sign may be used. In the example shown in FIGS. 12A and 12B, among the distances d211 to d215 for the after-rotation point group information LO21, the values of the distances d211 and d212 are negative values, and the values of the distances d213 to d215 are positive values (the left side of the sheet plane is the positive side). That is, the sign changes once, in the distances d211 to d215. On the other hand, all the distances d221 to d225 for the after-rotation point group information LO22 are positive values, and therefore the sign does not change in the distances d211 to d215 (the number of changes is zero). In this case, since the change in the values of the distances d211 to d215 is greater than the change in the values of the distances d221 to d225, it can be said that the after-rotation point group information LO022 is higher in parallelism degree than the after-rotation point group information LO21.

Figure 13:
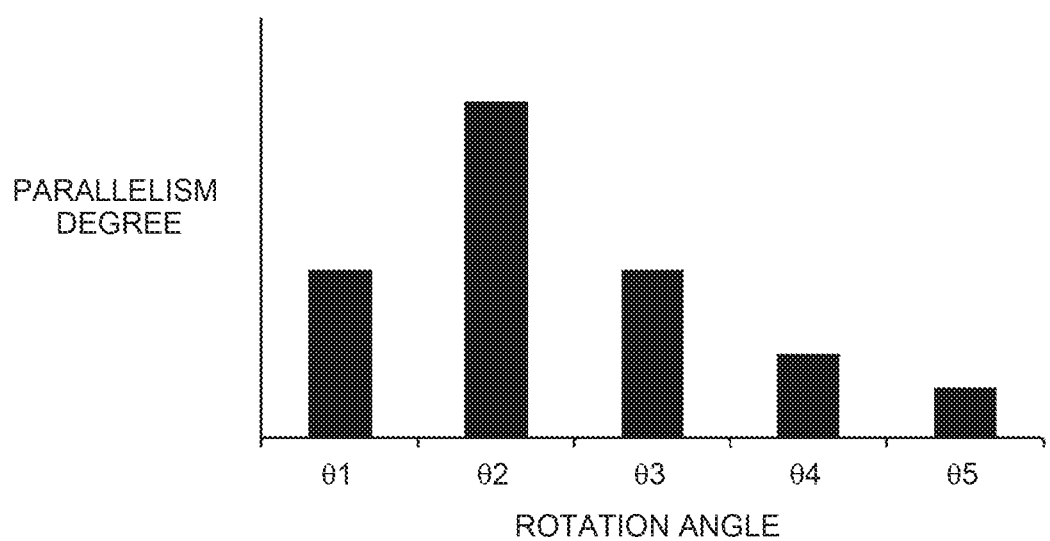
FIG. 13 is a graph showing an example of a comparison of parallelism degrees between the after-rotation point group information and the camera detection object according to the second embodiment.

Next, the axis deviation angle estimation unit 140 compares the parallelism degree PA1 to PA5 (FIG. 13), and estimates that the axis deviation angle is the rotation angle $\theta 2n$ corresponding to the after-rotation point group information LO2$n$ for which the highest parallelism degree is calculated. In the above case, since the highest value is PA2, the parallelism degree for the camera detection object CO is highest when the LIDAR detection object LO is rotated by the rotation angle $\theta 2$. That is, the parallelism degree between the camera detection object CO estimated to be the white line and the LIDAR detection object LO estimated to be the roadside body parallel to the white line is highest. Accordingly, it is estimated that the axis deviation angle of the LIDAR 20 is $\theta 2$. To be precise, it is estimated that the value closest to the real axis deviation angle among the plurality of rotation angles $\theta 1$ to $\theta 5$ is $\theta 2$.

With the above configuration, it is possible to accurately detect the axis deviation of the LIDAR 20 from the camera 10 without depending on vehicle behavior.

In the above description, the case where the LIDAR 20 determines that the LIDAR detection object LO is the roadside body parallel to the white line has been described. However, the second embodiment can be similarly applied to the case where it is not possible to determine whether the LIDAR detection object LO is the white line or the roadside parallel to the white line. This is because the above-described parallelism degree is calculated so as to be a high value both in the case where the LIDAR detection object LO coincides with the camera detection object CO and in the case where the LIDAR detection object LO is parallel to the camera detection object CO without coinciding with the camera detection object CO.

In the case where the LIDAR detection object LO is actually the roadside body parallel to the white line, the second embodiment can be applied as described above. On the other hand, in the case where the LIDAR detection object LO is actually the white line, the LIDAR detection object LO (or the after-rotation point group information) and the camera detection object CO coincide in the state where there is no axis deviation of the LIDAR 20 from the camera 10 (or in a state where there is an axis deviation and where the LIDAR detection object LO is rotated by the real axis deviation angle). At this time, the above-described parallelism degree is high (as in the case where the LIDAR detection object LO is actually the roadside body parallel to the white line).

Next, processes that are executed by the axis deviation detection device 100 will be specifically described with reference to flowcharts in FIG. 14 and FIG. 15.

Only different points from the first embodiment will be described, and descriptions of common points with the first embodiment will be omitted. The processor 101 of the axis deviation detection device 100 executes the flowchart described below. In the case where the determination of "the camera detection object CO and the LIDAR detection object LO are not identical" is made in S5 in the first embodiment (in the case where the determination of NO is made in S5), the process proceeds to S20 in the second embodiment.

In S20, the axis deviation angle estimation unit 140 estimates the axis deviation angle of the LIDAR from the camera, based on the parallelism degree between the camera detection object and the LIDAR detection object. S20 is constituted by S21 to S24 (see FIG. 15). In S21, the axis deviation angle estimation unit 140 rotates the LIDAR detection object LO by a plurality of rotation angles. Next, in S22, the axis deviation angle estimation unit 140 calculates the distance from the camera detection object CO for each piece of point information constituting the after-rotation point group information LO21 to LO25 after the LIDAR detection object LO is rotated. Next, in S23, the axis deviation angle estimation unit 140 calculates the parallelism degree between the after-rotation point group information LO21 to LO25 and the camera detection object CO, for each of the rotation angles $\theta 21$ to $\theta 25$. Next, in S24, the axis deviation angle estimation unit 140 estimates that the axis deviation angle is the rotation angle for which the parallelism degree is highest.

With the above configuration, it is possible to accurately detect the axis deviation of the LIDAR 20 from the camera 10 without depending on vehicle behavior.

Modification of Second Embodiment

Next, a modification of the second embodiment will be described. In the second embodiment, the case where it is determined that the single LIDAR detection object LO is the roadside body parallel to the white line and the case where it is not possible to determine whether the LIDAR detection object LO is the white line or the roadside body parallel to the white line have been discussed. In the modification, a case where a plurality of LIDAR detection objects LO is detected and where the determination of whether the LIDAR detection object LO is the white line or the roadside body parallel to the white line cannot be made for any LIDAR detection object LO will be described.

Figure 16:
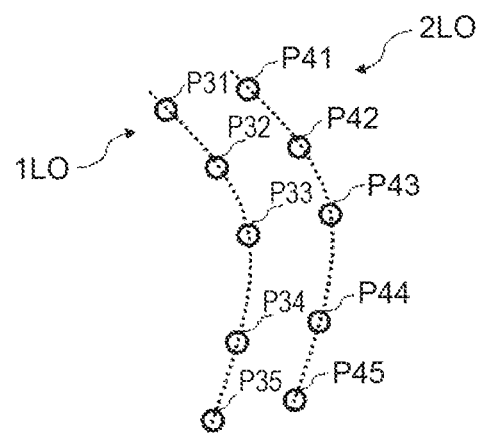
FIG. 16 is a schematic diagram showing a LIDAR detection object according to a modification of the second embodiment.

Specifically, suppose that a first object 1LO (constituted by point information P31 to P35) and a second object 2LO (constituted by point information P41 to P45) are detected as the LIDAR detection object LO as shown in FIG. 16 and the determination of whether the LIDAR detection object LO is the white line or the roadside body parallel to the white line cannot be made for any LIDAR detection object LO.

In the modification, the process is roughly divided into (i) a step of identifying point information coinciding with or close to the camera detection object CO, from point information constituting the plurality of LIDAR detection objects LO, and (ii) a step of evaluating the amount of the change in the distance between point information resulting from removing the point information coinciding with or close to the camera detection object CO from the whole point information and the camera detection object CO. That is, in the process, an assumption of "the point information coinciding with or close to the camera detection object CO is point information constituting the white line and the other point information is point information constituting the roadside body parallel to the white line" in the point information in the LIDAR detection object LO for which the discrimination between the white line and the roadside body parallel to the white line cannot be performed is made once. Then, it is determined whether the other point information is parallel to the camera detection object CO as the position relation. In the case where the other point information is parallel to the camera detection object CO as the position relation, there is a high probability that the other point information constitutes the roadside body parallel to the white line. Therefore, the assumption is correct, that is, the rotation angle is close to the axis deviation angle. In contrast, in the case where the other point information is not parallel to the camera detection object as the position relation, there is a low probability that the other point information constitutes the roadside body parallel to the white line. Therefore, the assumption is incorrect, that is, the rotation angle is not close to the axis deviation angle.

Similarly to the second embodiment, the axis deviation angle estimation unit 140 rotates the LIDAR detection object LO (the first object 1LO and the second object 2LO)

by a predetermined angle, and then compares the LIDAR detection object LO with the camera detection object CO. Specifically, the axis deviation angle estimation unit 140 rotates the LIDAR detection object LO by a plurality of rotation angles θ21 to θ25. The description of the rotation angles θ21 to θ25 is the same as that in the second embodiment, and therefore is omitted. Point group information after the first object 1LO is rotated by the rotation angle θ21 is referred to as first object after-rotation point group information LO31, and pieces of point information constituting the first object after-rotation point group information LO31 are referred to as point information PO311 to P315 (see FIGS. 17A to 17C). Further, point group information after the second object 2LO is rotated by the rotation angle θ21 is referred to as second object after-rotation point group information LO41, and pieces of point information constituting the second object after-rotation point group information LO41 are referred to as point information P411 to P415 (see FIGS. 17A to 17C).

Similarly, pieces of point group information after the first object 1LO is rotated by the rotation angles θ22 to θ25 are referred to as first object after-rotation point group information LO32 to LO35, respectively, and pieces of point information constituting the first object after-rotation point group information LO32 to LO35 are referred to as P321 to P325, P331 to P335, P341 to P345, and P351 to P355, respectively. Pieces of point group information after the second object 2LO is rotated by the rotation angles θ22 to θ25 are referred to as second object after-rotation point group information LO42 to LO45, respectively, and pieces of point information constituting the second object after-rotation point group information LO42 to LO45 are referred to as P421 to P425, P431 to P435, P441 to P445, and P451 to P455, respectively (not illustrated).

Next, the axis deviation angle estimation unit 140 calculates distances d311 to d315 from the camera detection object CO for the respective pieces of the point information P311 to P315 constituting the first object after-rotation point group information LO31. Furthermore, the axis deviation angle estimation unit 140 calculates distances d411 to d415 from the camera detection object CO for the respective pieces of the point information P411 to P415 constituting the second object after-rotation point group information LO41.

Furthermore, in the modification, the axis deviation angle estimation unit 140 compares the distance between the point information corresponding to the first object after-rotation point group information and the camera detection object CO and the distance between the point information corresponding to the second object after-rotation point group information and the camera detection object CO. Next, the axis deviation angle estimation unit 140 calculates the parallelism degree for the camera detection object CO, using the point information corresponding to the larger one of the two compared distances.

Figure 17A:
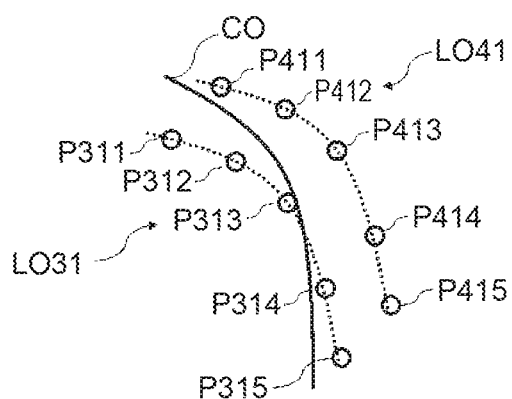
FIG. 17A is a schematic diagram for describing a process according to the modification of the second embodiment.
Figure 17B:
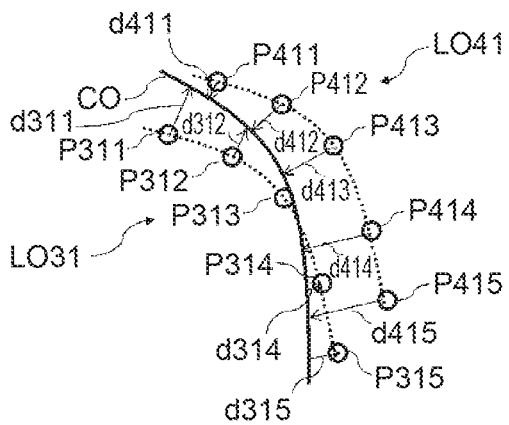
FIG. 17B is a schematic diagram for describing the process according to the modification of the second embodiment.
Figure 17C:
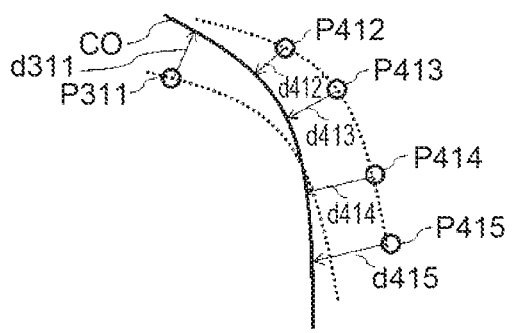
FIG. 17C is a schematic diagram for describing the process according to the modification of the second embodiment.

With reference to FIGS. 17A to 17C, a specific example will be described using the first object after-rotation point group information LO31 and the second object after-rotation point group information LO41 after the first object 1LO and the second object 2LO are rotated by the rotation angle θ21.

First, the axis deviation angle estimation unit 140 compares the distance d311 between the point information P311 constituting the first object after-rotation point group information LO031 and the camera detection object CO and the distance d411 between the point information P411 constituting the second object after-rotation point group information LO41 and the camera detection object CO. In the example shown in FIGS. 17A to 17C, as a result of the comparison, it is determined that the distance d311 is larger than the distance d411. The axis deviation angle estimation unit 140 executes the same process between the distance d312 and the distance d412, between the distance d313 and the distance d413, between the distance d314 and the distance d414, and between the distance d315 and the distance d415. As a result, it is determined that the distance d412 is larger than the distance d312, it is determined that the distance d413 is larger than the distance d313, it is determined that the distance d414 is larger than the distance d314, and it is determined that the distance d415 is larger than the distance d315.

Next, the axis deviation angle estimation unit 140 calculates a parallelism degree PA11 for the camera detection object CO, using the point information corresponding to the larger one of the compared distances. That is, the axis deviation angle estimation unit 140 extracts the point information P311 for which the distance from the camera detection object CO is the distance d311, the point information P412 for which the distance from the camera detection object CO is the distance d412, the point information P413 for which the distance from the camera detection object CO is the distance d413, the point information P414 for which the distance from the camera detection object CO is the distance d414, and the point information P415 for which the distance from the camera detection object CO is the distance d415, and calculates the parallelism degree PA11 between the point information and the camera detection object CO. The calculation method for the parallelism degree is the same as that in the second embodiment, and therefore the description is omitted.

Figure 18A:
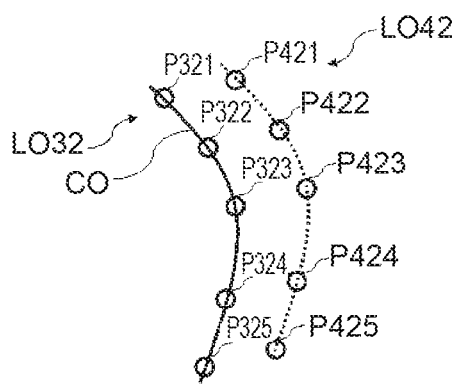
FIG. 18A is a schematic diagram for describing a process according to the modification of the second embodiment.
Figure 18B:
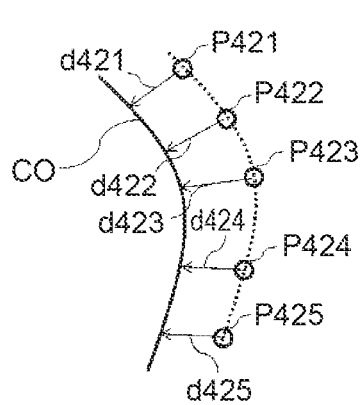
FIG. 18B is a schematic diagram for describing the process according to the modification of the second embodiment.

Next, the first object after-rotation point group information LO32 and the second object after-rotation point group information LO42 after the first object 1LO and the second object 2LO are rotated by the rotation angle θ22 will be specifically described with reference to FIGS. 18A and 18B.

First, the axis deviation angle estimation unit 140 compares the distance d321 between the point information P321 constituting the first object after-rotation point group information LO032 and the camera detection object CO and the distance d421 between the point information P421 constituting the second object after-rotation point group information LO42 and the camera detection object CO. In the example shown in FIGS. 18A and 18B, as a result of the comparison, it is determined that the distance d421 is larger than the distance d321 (in FIGS. 18A and 18B, the distance d321 is not illustrated because the point information P321 overlaps with the camera detection object CO or is very close to the camera detection object CO). The axis deviation angle estimation unit 140 executes the same process between the distance d322 and the distance d422, between the distance d323 and the distance d423, between the distance d324 and the distance d424, and between the distance d325 and the distance d425. As a result, it is determined that the distance d422 is larger than the distance d322, it is determined that the distance d423 is larger than the distance d323, it is determined that the distance d424 is larger than the distance d324, and it is determined that the distance d425 is larger than the distance d325.

Next, the axis deviation angle estimation unit 140 calculates a parallelism degree PA12 for the camera detection object CO, using the point information corresponding to the larger one of the compared distances. That is, the axis deviation angle estimation unit 140 extracts the point information P421 for which the distance from the camera detection object CO is the distance d421, the point information P422 for which the distance from the camera detection object CO is the distance d422, the point information P423 for which the distance from the camera detection object CO is the distance d423, the point information P424 for which the distance from the camera detection object CO is the distance d424, and the point information P425 for which the distance from the camera detection object CO is the distance d425, and calculates the parallelism degree PA12 between the point information and the camera detection object CO. The calculation method for the parallelism degree is the same as that in the second embodiment, and therefore the description is omitted.

The axis deviation angle estimation unit 140 executes the same process for the first object after-rotation point group information LO33 to LO35 and the second object after-rotation point group information LO43 to LO45 after the first object 1 LO and the second object 2LO are rotated by the rotation angles θ23 to θ25, compares calculated parallelism degrees PA11 to PA15, and estimates that the axis deviation angle is the rotation angle corresponding to the after-rotation point group information for which the highest parallelism is calculated. In the case shown in FIGS. 17A to 17C and FIGS. 18A and 188, the axis deviation angle estimation unit 140 estimates that the axis deviation angle is the rotation angle θ22.

This result means that the point information d321, d322, d323, d324, d325 for which the distance from the camera detection object CO is small is the point information constituting the white line, or is likely to be the point information constituting the white line, when the first object 1LO and the second object 2LO are rotated by the rotation angle θ22. Further, this result means that the point information d421, d422, d423, d424, d425 for which the distance from the camera detection object CO is large and the parallelism degree for the camera detection object CO is high is the point information constituting the roadside body parallel to the white line, or is likely to be the point information constituting the roadside body parallel to the white line.

Next, a process that is executed by the axis deviation detection device 100 will be specifically described with reference to a flowchart in FIG. 19.

Only different points from the second embodiment will be described. FIG. 19 is a flowchart showing a process in the axis deviation detection device 100. In the axis deviation detection device 100, the processor 101 executes the flowchart as described below.

Figure 14:
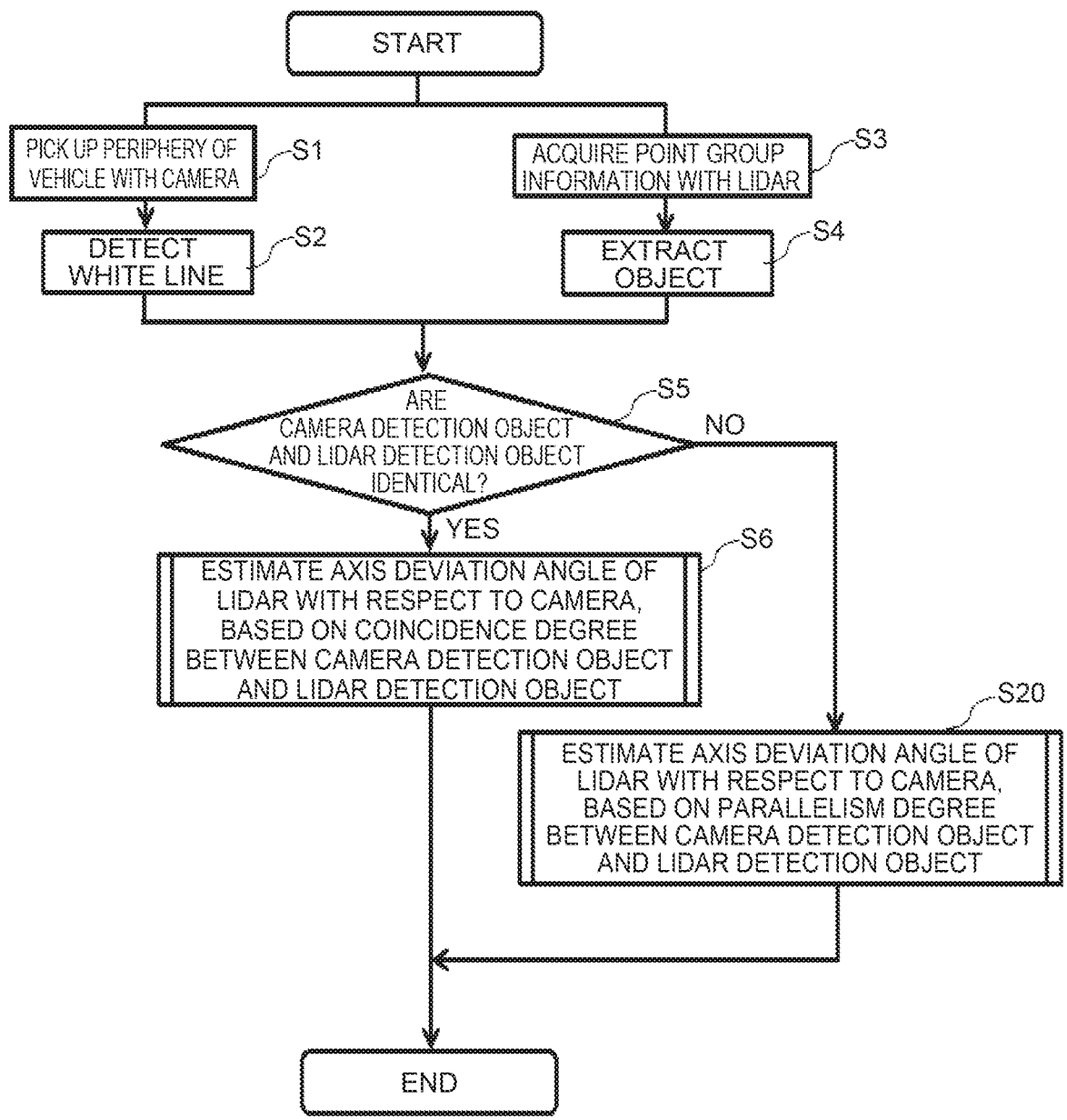
FIG. 14 is a flowchart showing a process according to the second embodiment.
Figure 15:
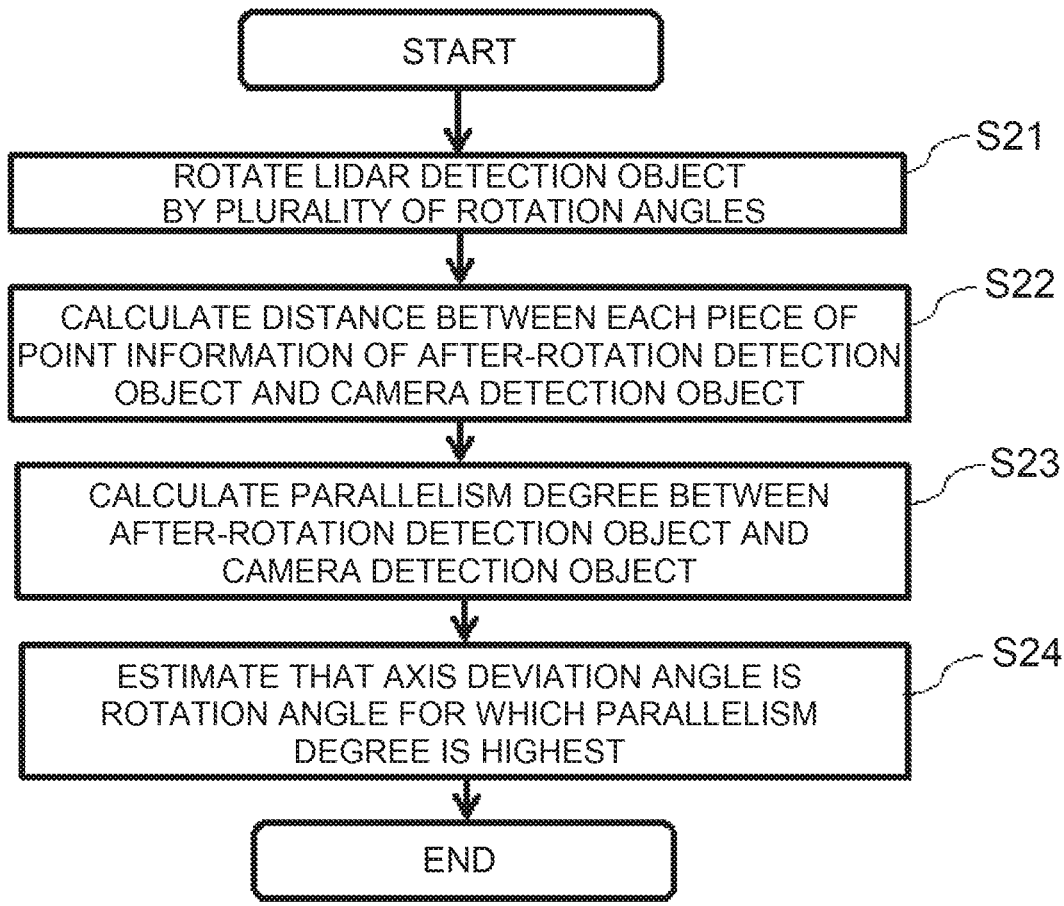
FIG. 15 is a flowchart showing a process according to the second embodiment.

In the modification, S31 to S35 are executed, as steps constituting S20 in which the axis deviation estimation process shown in FIG. 14 is performed. In S31, the axis deviation angle estimation unit 140 rotates the first object and the second object by predetermined angles (a plurality of rotation angles). In S32, the axis deviation angle estimation unit 140 calculates the distance from the camera detection object for each piece of point information constituting the first object after-rotation point group information and the second object after-rotation point group information. Next, in S33, the axis deviation angle estimation unit 140 compares the "distance between the point information constituting the first object after-rotation point group information and the camera detection object" and the "distance between the point information constituting the second object after-rotation point group information and the camera detection object" that correspond to each other. Next, in S34, the axis deviation angle estimation unit 140 calculates the parallelism degree between the plurality of pieces of point information and the camera detection object, using the point information corresponding to the larger one of the compared distances. Next, in S35, the axis deviation angle estimation unit 140 estimates that the axis deviation angle is the rotation angle corresponding to the first object after-rotation point group information and the second object after-rotation point group information for which the highest parallelism degree is calculated among the parallelism degrees that are calculated for the first object after-rotation point group information and the second object after-rotation point group information and that correspond to the plurality of rotation angles.

With the above configuration, it is possible to accurately detect the axis deviation of the LIDAR 20 from the camera 10 without depending on vehicle behavior.

What is claimed is:

1. An axis deviation detection device for an on-board LIDAR, the axis deviation detection device detecting an axis deviation of a LIDAR that is mounted on a vehicle, the axis deviation detection device comprising:
    a first detection unit that detects a first object from pickup information, the pickup information being acquired by a camera that is disposed in an interior of a vehicle cabin of the vehicle;
    a second detection unit that detects a second object from point information, the point information being acquired by the LIDAR that is disposed in an exterior of the vehicle cabin of the vehicle; and
    an axis deviation angle estimation unit that estimates an axis deviation angle of the LIDAR with respect to the camera, wherein
    the axis deviation angle estimation unit estimates that the axis deviation angle of the LIDAR with respect to the camera is a predetermined angle, in a case where a result of comparison between a detection result of the first detection unit and an after-rotation detection result satisfies a predetermined condition, the after-rotation detection result being a result from rotating a detection result of the second detection unit by the predetermined angle about an attachment position of the LIDAR on the vehicle.

2. The axis deviation detection device for the on-board LIDAR according to claim 1, further comprising an object relation determination unit that determines whether the first object and the second object satisfy a predetermined relation, wherein
    the axis deviation angle estimation unit estimates that the axis deviation angle of the LIDAR with respect to the camera is the predetermined angle, in a case where the object relation determination unit determines that the first object and the second object are identical and where the predetermined condition is a condition that a coincidence degree between the detection result of the first detection unit and the after-rotation detection result is equal to or higher than a coincidence degree threshold.

3. The axis deviation detection device for the on-board LIDAR according to claim 2, wherein the coincidence degree is calculated so as to be a high degree in a case where a sum of a distance is small, in comparison between the case where the sum of the distance is small and a case where the sum of the distance is large, the distance being a distance between the detection result of the first detection unit and the point information constituting the after-rotation detection result.

4. The axis deviation detection device for the on-board LIDAR according to claim 1, wherein each of the first object and the second object is a white line drawn on a road.

5. The axis deviation detection device for the on-board LIDAR according to claim 1, further comprising an object relation determination unit that determines whether the first object and the second object satisfy a predetermined relation, wherein the axis deviation angle estimation unit estimates that the axis deviation angle of the LIDAR with respect to the camera is the predetermined angle, in a case where the object relation determination unit determines that the first object and the second object are not identical and where the predetermined condition is a condition that a parallelism degree between the detection result of the first detection unit and the after-rotation detection result is equal to or higher than a parallelism degree threshold.

6. The axis deviation detection device for the on-board LIDAR according to claim 5, wherein the parallelism degree is calculated so as to be a high degree in a case where a change amount of a distance is small, in comparison between the case where the change amount of the distance is small and a case where the change amount of the distance is large, the distance being a distance between the detection result of the first detection unit and the point information constituting the after-rotation detection result.

7. The axis deviation detection device for the on-board LIDAR according to claim 1, wherein the first object is a white line drawn on a road, and the second object is a roadside body parallel to the white line.

8. The axis deviation detection device for the on-board LIDAR according to claim 3, wherein the distance is a distance between the point information constituting the after-rotation detection result and an intersection point of a perpendicular line dropped from the point information to the detection result of the first detection unit and the detection result of the first detection unit.

* * * * *